(12) United States Patent
Ananthanarayanan et al.

(10) Patent No.: US 10,225,582 B1
(45) Date of Patent: Mar. 5, 2019

(54) PROCESSING LIVE VIDEO STREAMS OVER HIERARCHICAL CLUSTERS

(71) Applicant: Microsoft Technology Licensing, LLC, Redmond, WA (US)

(72) Inventors: Ganesh Ananthanarayanan, Bellevue, WA (US); Matthai Philipose, Seattle, WA (US); Peter Bodik, Kirkland, WA (US); Chien-Chun Hung, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/844,278

(22) Filed: Dec. 15, 2017

Related U.S. Application Data

(60) Provisional application No. 62/552,211, filed on Aug. 30, 2017.

(51) Int. Cl.
| | | |
|---|---|---|
| *H04N 21/236* | (2011.01) | |
| *H04N 21/435* | (2011.01) | |
| *H04N 21/2187* | (2011.01) | |
| *G06F 17/30* | (2006.01) | |

(52) U.S. Cl.
CPC ... *H04N 21/2187* (2013.01); *G06F 17/30469* (2013.01); *G06F 17/30817* (2013.01); *H04N 21/236* (2013.01)

(58) Field of Classification Search
CPC combination set(s) only.
See application file for complete search history.

(56) References Cited

PUBLICATIONS

"Apache Hadoop NextGen MapReduce (YARN)", Retrieved from <<https://hadoop.apache.org/docs/r2.7.1/hadoop-yarn/hadoop-yarn-site/YARN.html>>, Jun. 29, 2015, 2 Pages.
"Apache Storm", Retrieved from <<https://storm.apache.org/>>, 2015, 3 Pages.
"Avigilon", Retrieved from <<http://avigilon.com/products/>>, Retrieved on: Jul. 19, 2017, 2 Pages.
"AXIS camera application platform", Retrieved from <<https://goo.gl/tqmBEy>>, Retrieved on: Jul. 19, 2017, 2 Pages.
"Genetec", Retrieved from <<https://www.genetec.com/>>, 2013, 7 Pages.

(Continued)

*Primary Examiner* — Kieu Oanh T Bui
(74) *Attorney, Agent, or Firm* — Schwegman Lundberg & Woessner, P.A.

(57) ABSTRACT

A global manager communicates with various local managers to receive and process video queries. The video queries identify components that process live video streams, placement options for where the components of the video query may be executed, and various video query plans. The video query plans include options such as framerate and video quality. As the global manager processes the video queries, the global manager determines an initial set of video query configurations that identify a video query plan and placement option for each component of a given video query. Using the initial set of video query configurations, the global manager then determines an optimal set of video query configurations for the received set of video queries. The global manager communications instructions to the local managers to execute the components of the video queries using the video query plans and placement options from the optimal set of video query configurations.

20 Claims, 13 Drawing Sheets

(56) References Cited

PUBLICATIONS

"Introduction to SIFT (Scale-Invariant Feature Transform)", Retrieved from <<http://docs.opencv.org/3.1.0/da/df5/tutorial_py_sift_intro.html>>, Dec. 18, 2015, 3 Pages.

"Introduction to SURF (Speeded-Up Robust Features)", Retrieved from <<http://docs.opencv.org/3.0-beta/doc/py_tutorials/py_feature2d/py_surf_intro/py_surf_intro.html>>, 2011, 4 Pages.

Abadi, et al., "The design of the borealis stream processing engine", In Proceedings of Second Biennial Conference Innovative Data Systems Research, vol. 5, Jan. 4, 2005, 13 Pages.

Abdullah, et al., "Traffic Monitoring Using Video Analytics in Clouds", In Proceedings of 7th International Conference on Utility and Cloud Computing, Apr. 8, 2014, 11 Pages.

Agarwal, et al., "BlinkDB: Queries with Bounded Errors and Bounded Response Times on Very Large Data", In Proceedings of 8th ACM European Conference on Computer Systems, Apr. 15, 2013, pp. 29-42.

Ananthanarayanan, et al., "GRASS: trimming stragglers in approximation analytics", In Proceedings of the 11th USENIX Conference on Networked Systems Design and Implementation, Apr. 2, 2014, pp. 1-14.

Ananthanarayanan, et al., "Real-time Video Analytics—the killer app for edge computing", In Journal of IEEE Computer, Retrieved on: Jul. 17, 2017, 11 Pages.

Armbrust, et al., "Spark SQL: Relational data processing in Spark", In Proceedings of ACM SIGMOD International Conference on Management of Data, May 31, 2015, pp. 1383-1394.

Balan, et al.,"Simplifying cyber foraging for mobile devices", In Proceedings of 5th International Conference on Mobile Systems, Applications and Services, Jun. 11, 2007, pp. 272-285.

Balan, et al., "Tactics-based remote execution for mobile computing", In Proceedings of 1st International Conference on Mobile Systems, Applications and Services, May 5, 2003, pp. 273-286.

Ballani, et al. "Towards predictable datacenter networks", In Proceedings of ACM SIGCOMM Conference, Aug. 15, 2011, pp. 242-253.

Boutin, et al., "Apollo: Scalable and coordinated scheduling for cloud-scale computing", In Proceedings of 11th USENIX Conference on Operating Systems Design and Implementation, Oct. 6, 2014, pp. 285-300.

Brand, et al., "Herakles: A System for Sensor-Based Live Sport Analysis using Private Peer-to-Peer Networks", In Proceedings of Database Systems for Business, Technology and the Web, Mar. 2, 2015,10 Pages.

Chandramouli, et al., "Trill: A High-Performance Incremental Query Processor for Diverse Analytics", In Proceedings of Very Large Data Bases Endowment, vol. 8, Issue 4, Aug. 31, 2015, pp. 401-412.

Cherniack, et al., "Scalable Distributed Stream Processing", In Proceedings of First Biennial Conference on Innovative Data Systems Research, Jan. 2003, 12 Pages.

Cormod, et al., "Synopses for Massive Data: Samples, Histograms, Wavelets, Sketches", In Journal of Foundations and Trends in Databases, vol. 4, No. 1-3, Jan. 2012, pp. 1-294.

Cuervo, et al., "MAUI: Making Smartphones Last Longer with Code Offload", In Proceedings of 8th International Conference on Mobile Systems, Applications, and Services, Jun. 15, 2010, 13 Pages.

Francescani, Chris, "NYPD expands surveillance net to fight crime as well as terrorism", Retrieved from <<https://goo.gl/Y9OKh0>>, Jun. 21, 2013, 5 Pages.

Ghodsi, et al., "Dominant Resource Fairness: Fair Allocation of Multiple Resource Types", In Proceedings of 8th USENIX Conference on Networked Systems Design and Implementation, Mar. 30, 2011, pp. 1-14.

Gu, et al., "Adaptive offloading for pervasive computing", In Journal of IEEE Pervasive Computing, vol. 3, Issue 3, Jul. 2004, pp. 66-73.

Han, et al., "MCDNN: An approximation-based execution framework for deep stream processing under resource constraints", In Proceedings of 14th Annual International Conference on Mobile Systems, Applications, and Services, Jun. 25, 2016, 14 Pages.

Hindman, et al., "Mesos: a platform for fine-grained resource sharing in the data center", In Proceedings of 8th USENIX conference on Networked systems design and implementation, Mar. 30, 2011, pp. 1-14.

Johnson, et al., "DenseCap: Fully Convolutional Localization Networks for Dense Captioning", In Proceedings of IEEE Conference on Computer Vision and Pattern Recognition, Jun. 27, 2016, pp. 4565-4574.

Kloudas, et al., "Pixida: Optimizing Data Parallel Jobs inWide-Area Data Analytics", In Proceedings of VLDB Endowment, vol. 9, No. 2, Oct. 2015, pp. 72-83.

Krishnamurthy, et al., "On-the-fly sharing for streamed aggregation", In Proceedings of the ACM SIGMOD international conference on Management of data, Jun. 27, 2006, pp. 623-634.

Lee, et al., "Towards Quality Aware Collaborative Video Analytic Cloud", In Proceedings of IEEE Fifth International Conference on Cloud Computing, Jun. 24, 2012, pp. 147-154.

Li, et al., "Task allocation for distributed multimedia processing on wirelessly networked handheld devices", In Proceedings of International Parallel and Distributed Processing Symposium, Apr. 15, 2001, 6 pages.

Likamwa, et al., "Starfish: Efficient concurrency support for computer vision applications", In Proceedings of 13th Annual International Conference on Mobile Systems, Applications, and Services, May 18, 2015, 14 Pages.

Liu, et al., "A Holistic Cloud-Enabled Robotics System for Real-Time Video Tracking Application", In Publication of Springer—Future Information Technology, Jan. 2014, 8 Pages.

Lu, et al., "Optasia: A relational platform for efficient large-scale video analytics", In Proceedings of Seventh ACM Symposium on Cloud Computing, Oct. 5, 2016, 14 Pages.

Lu, et al., "VisFlow: A Relational Platform for Efficient Large-Scale Video Analytics", In Technical Report MSR-TR-2016-13, Jun. 7, 2016, pp. 1-14.

Madden, et al., "Continuously adaptive continuous queries over streams", In Proceedings of the ACM SIGMOD international conference on Management of data, Jun. 4, 2002, 12 Pages.

Motwani, et al., "Query processing, resource management, and approximation in a data stream management system", In Proceedings of First Biennial Conference on Innovative Data Systems Research, Jan. 5, 2003, 12 Pages.

Pietzuch, et al. "Network-aware operator placement for stream-processing systems", In Proceedings of the 22nd International Conference on Data Engineering, Apr. 3, 2006, 12 Pages.

Popa, et al., "Faircloud: Sharing the network in cloud computing", In Proceedings of ACM SIGCOMM Conference on Applications, Technologies, Architectures, and Protocols for Computer Communication, Aug. 13, 2012, 12 Pages.

Pu, et al., "Low latency geodistributed data analytics", In Proceedings of ACM SIGCOMM Computer Communication Review, vol. 45, Issue 4, Aug. 17, 2015, 14 Pages.

Ra, et al., "Odessa: enabling interactive perception applications on mobile devices", In Proceedings of 9th International Conference on Mobile Systems, Applications, and Services, Jun. 28, 2011, 14 Pages.

Rabkin, et al., "Aggregation and Degradation in JetStream: Streaming Analytics in the Wide Area", In Proceedings of the 11th USENIX Conference on Networked Systems Design and Implementation, Apr. 2, 2014, pp. 275-288.

Rijsberge, C. J. Van, "Information Retrieval", In Publication of Butterworth-Heinemann, 1979, 153 Pages.

Roy, et al., "Efficient and extensible algorithms for multi query optimization", In Proceedings of the ACM SIGMOD international conference on Management of data, May 15, 2000, pp. 249-260.

Sellis, et al., "On the multiple-query optimization problem", In Journal of the IEEE Transactions on Knowledge and Data Engineering, vol. 2, Issue 2, Jun. 1990, pp. 262-266.

Silberstein, et al., "Many-to-many aggregation for sensor networks", In Proceedings of the IEEE 23rd International Conference on Data Engineering, Apr. 15, 2007, pp. 1-14.

(56) References Cited

PUBLICATIONS

Simonyan, et al., "Very deep convolutional networks for large-scale image recognition", In Journal of the Computing Research Repository, Sep. 2014, pp. 1-14.

Srivastava, et al., "Operator placement for in-network stream query processing", In Proceedings of the twenty-fourth ACM SIGMODSIGACT-SIGART symposium on Principles of database systems, Jun. 13, 2005, pp. 1-10.

Taigman, et al., "Deep-Face: Closing the Gap to Human-Level Performance in Face Verification", In Proceedings of the IEEE Conference on Computer Vision and Pattern Recognition, Jun. 23, 2014, 8 Pages.

Trigoni, et al., "Multi-query optimization for sensor networks", In Proceedings of the First IEEE International Conference on Distributed Computing in Sensor Systems, Jun. 30, 2005, pp. 1-15.

Varian, Hal R., "Equity, envy, and efficiency", In Journal of Economic Theory, Sep. 1974, 68 Pages.

Venkataraman, et al., "The power of choice in data-aware cluster scheduling", In Proceedings of the 11th USENIX on Operating Systems Design and Implementation, Oct. 6, 2014, pp. 301-316.

Verma, et al., "Large-scale cluster management at Google with Borg", In Proceedings of the Tenth European Conference on Computer Systems, Apr. 21, 2015, 17 Pages.

Viswanathan, et al., "CLARINET: WAN-Aware Optimization for Analytics Queries", In Proceedings of the 12th USENIX Symposium on Operating Systems Design and Implementation, Nov. 2, 2016, 16 Pages.

Vulimiri, et al., "Global analytics in the face of bandwidth and regulatory constraints", In Proceedings of the 12th USENIX Conference on Networked Systems Design and Implementation, May 4, 2015, pp. 323-336.

Zaharia, et al., "Discretized Streams: Fault-Tolerant Streaming Computation at Scale", In Proceedings of the Twenty-Fourth ACM Symposium on Operating Systems Principles, Nov. 3, 2013, pp. 423-438.

Xiang, et al., "Two-tier multiple query optimization for sensor networks", In Proceedings of the 27th International Conference on Distributed Computing Systems, Jun. 25, 2007, 9 Pages.

Zhang, et al., "A video cloud platform combing online and offline cloud computing technologies", In Journal of Personal and Ubiquitous Computing, vol. 19, Issue 7, Sep. 2015, pp. 1099-1110.

Zhang, et al., "Live Video Analytics at Scale with Approximate and Delay-Tolerant Processing", In Proceedings of the 14th USENIX Symposium on Networked Systems Design and Implementation, Mar. 27, 2017, pp. 377-392.

Zhou, et al., "Learning deep features for scene recognition using places database", In Proceedings of the Annual Conference on Neural Information Processing Systems, Dec. 8, 2014, pp. 1-9.

PROCESSING LIVE VIDEO STREAMS OVER HIERARCHICAL CLUSTERS

CROSS-REFERENCE TO RELATED APPLICATIONS

This application claims the benefit of priority to U.S. Pat. App. No. 62/552,211, filed Aug. 30, 2017 and titled "PROCESSING LIVE VIDEO STREAMS OVER HIERARCHICAL CLUSTERS," the disclosure of which is hereby incorporated by reference in its entirety.

TECHNICAL FIELD

The subject matter disclosed herein generally relates to the processing of one or more live video streams over hierarchical clusters and, in particular, to determining a configuration of the components and resources such that the available computing and network resources are efficiently utilized in processing the one or more live video streams.

BACKGROUND

Major cities like London, New York, and Beijing are deploying tens of thousands of cameras. Analyzing live video streams is of considerable importance to many organizations. Traffic departments analyze video feeds from intersection cameras for traffic control, and police departments analyze city-wide cameras for surveillance. Organizations typically deploy a hierarchy of clusters to analyze their video streams. An organization, such as a city's traffic department, runs a private cluster to pull in the video feeds from its cameras (with dedicated bandwidths). The private cluster includes computing capacity for analytics while also tapping into public cloud services for overflow computing needs. The uplink bandwidth between the private cluster and the public cloud services, however, is usually not sufficient to stream all the camera feeds to the cloud for analytics. In addition, some video cameras have onboard computing capacity, however limited, for video analytics.

As known in the art of video analytics, a video analytics query defines a pipeline of computer vision components. For example, an object tracking query typically includes a "decoder" component that converts video to frames, followed by a "detector" component that identifies the objects in each frame, and an "associator" component that matches objects across frames, thereby tracking them over time. The various components may be included in software or hardware, such as a dedicated circuit (e.g., an application specific integrated circuit (ASIC)).

Video query components may have many implementation choices that provide the same abstraction. For example, object detectors take a frame and output a list of detected objects. Detectors can use background subtraction to identify moving objects against a static background or a deep neural network (DNN) to detect objects based on visual features. Background subtraction requires fewer resources than a DNN but is also less accurate because it misses stationary objects. Components can also have many "knobs" (e.g., adjustable attributes or settings) that further impact query accuracy and resource demands. Frame resolution is one such knob; higher resolution improves detection but requires more resources. Video queries may have thousands of different combinations of implementations and knob values. As used in this disclosure, "query planning" is defined as selecting the best combination of implementations and knob values for a query.

In addition to planning, components of queries have to be placed across the hierarchy of clusters. Placement dictates the multiple resource demands (network bandwidth, computing resources, etc.) at each cluster. For example, assigning the tracker query's detector component to the camera and the associator component to the private cluster uses computing and network resources of the camera and the private cluster, but not the uplink network bandwidth out of the private cluster or any resources in the public cloud. While a query plan has a single accuracy value, it can have multiple placement options each with its own resource demands.

Finally, multiple queries analyzing video from the same camera often have common components. For example, a video query directed to a car counter and a video query directed to a pedestrian monitor both need an object detector component and associator component. The common components are typically the core vision building blocks. Merging common components significantly saves resources, but some restrictions may apply (e.g., they can only be merged if they have the same plan and are placed in the same cluster.)

Current video analytics solutions make static decisions on query plans and placements. These decisions are often conservative on resource demands and result in low accuracies while leaving resources underutilized. At the same time, running all the queries at the highest accuracy is often infeasible because the private cluster does not have enough compute to run them locally, or bandwidth to push all the streams to the cloud. Production stream processing systems commonly employ fair sharing among queries. But fair sharing is a poor choice because its decisions are agnostic to the resource-accuracy relationships of queries.

SUMMARY

The disclosed systems and methods are directed to the technical problem of allocating resources within an environment to efficiently process video streams obtained from one or more video cameras. To address this problem, this disclosure proposes the solution of determining the most promising "configurations" of video query components, including combinations of a query plan and a placement, and then filtering out those that are inaccurate with a large resource demand (e.g., network bandwidth requirements and/or computing resources). As used herein, the promising configurations are defined as the "Pareto band" of configurations by applying the concepts of Pareto efficiency to the various combinations of the query plans and placements. This dramatically reduces the configurations to search with little impact on accuracy.

A disclosed heuristic greedily searches through the configurations within the Pareto band and prefers configurations with higher accuracy for its resource demand. Comparing resource demand vectors consisting of multiple resources across clusters, however, is non-trivial. For every configuration's demand vector, a resource cost is defined as the dominant utilization: maximum of ratio of demand to capacity across all resources and clusters in the hierarchy. Using the dominant utilization avoids the lopsided drain of any single resource at any cluster.

The disclosed systems and methods also merge common components of queries by carefully considering the aggregate accuracy and demand of different merging options. In doing so, it resolves potential merging conflicts—e.g., a DNN-based detector component is better for pedestrian monitoring while a background subtractor component is better for car counting.

Prior implementations, such as streaming databases considered the resource-accuracy tradeoff but did not address multiple knobs, multiple resources, or a hierarchy of clusters. In some implementations, prior networked streaming systems would consider a hierarchy but also tweak only one attribute, the sampling rate, based on network bandwidth.

In determining an optimal configuration for analyzing streaming video, the disclosed systems and methods generally perform the following operations: (1) formulate the problem of planning, placement, and merging for video analytics in hierarchical clusters, (2) efficiently search in a Pareto band of promising query configurations, and compare configurations on multiple resource demands across the hierarchy by defining a dominant utilization metric; and (3) study the resource-accuracy profiles of multiple real-world video analytics queries. Disclosed herein is an efficient profiler that generates the resource-accuracy profile by using 100 fewer CPU cycles than an exhaustive exploration.

BRIEF DESCRIPTION OF THE DRAWINGS

Some embodiments are illustrated by way of example and not limitation in the figures of the accompanying drawings.

DETAILED DESCRIPTION

Figure 1:
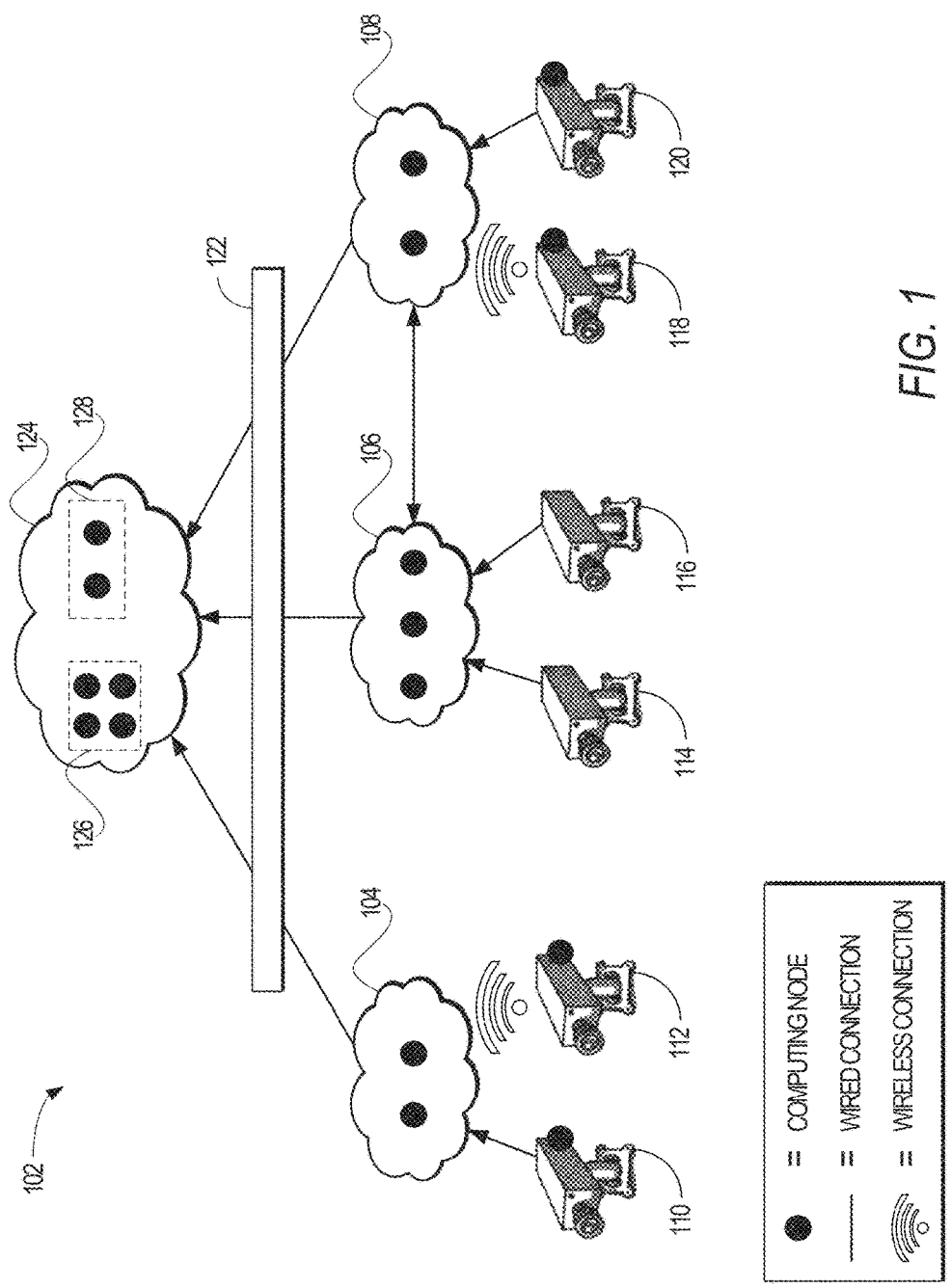
FIG. 1 is example illustration of a networked system, according to an example embodiment, where various cameras are sending streaming video into respective private clusters.

Organizations with a large deployment of cameras—e.g., cities, police departments, retail stores, and other types of organizations—typically use a hierarchy of clusters (or locations, interchangeably) to process video streams. FIG. 1 is an example illustration of a networked system 102, where various cameras 110-120 are sending streaming video into respective private clusters 104-108. The private clusters 104-108 may also be in communication with the public "cloud" 124 via a wide area network 122. When there are multiple private clusters, the cameras 110-120 are preconfigured to stream into one of them. In one embodiment, the connectivity between the cameras 110-120 and the private clusters 104-108 is via one or more dedicated connections (e.g., one or more wireless and/or wired connections). The private clusters 104-108 may further store the videos received from the cameras 110-120 in one or more storage devices and/or databases (not shown).

The various cameras 110-120 may be in communication with their respective private clusters 104-108 via one or more networked connections. The network bandwidth required to support a single camera can range from hundreds of kilobits per seconds (Kb/s) for a wireless camera to a few megabits per seconds (Mb/s) for high-resolution video or even above 10 Mb/s for multi-megapixel cameras. Each of the cameras 110-120 may be configurable to control the frame resolution and/or frame rate of the camera, thereby affecting the resulting bitrate of the video stream.

Computing capacity is another resource to consider in processing the various video streams from the cameras 110-120. Each private cluster 104-106 may also have computing capacity (e.g., the availability of one or more hardware processor cores) to process the video queries corresponding to the various video cameras 110-120. The computing capacities of the private clusters 104-108 may vary from a few hardware processor cores (e.g., a municipality or other smaller city) to hundreds of cores (e.g., a large city, such as New York City). An organization may also leverage the computing resources with publicly available (e.g., cloud) computing resources, such as Amazon EC2 and Microsoft Azure. One or more of the cameras 110-120, such as camera 110,112,118,120 may also have computing capacity for use in video analytics queries.

In general, a video query may have a large range of functionally equivalent configurations to choose from, which control their computing and network bandwidth demands. However, video analytics providers typically use hard-coded configurations. Placement of the components (e.g., a detector component, an associator component, etc.) of each query within the system 102—on a designated camera (e.g., camera 110), on private cluster (e.g., cluster 104), or in a publicly available resource (e.g., public resource 124)—may also be static, thereby precluding automatic splitting of a query across multiple clusters, joint decisions across queries, or merging common components of multiple queries.

Figure 2:
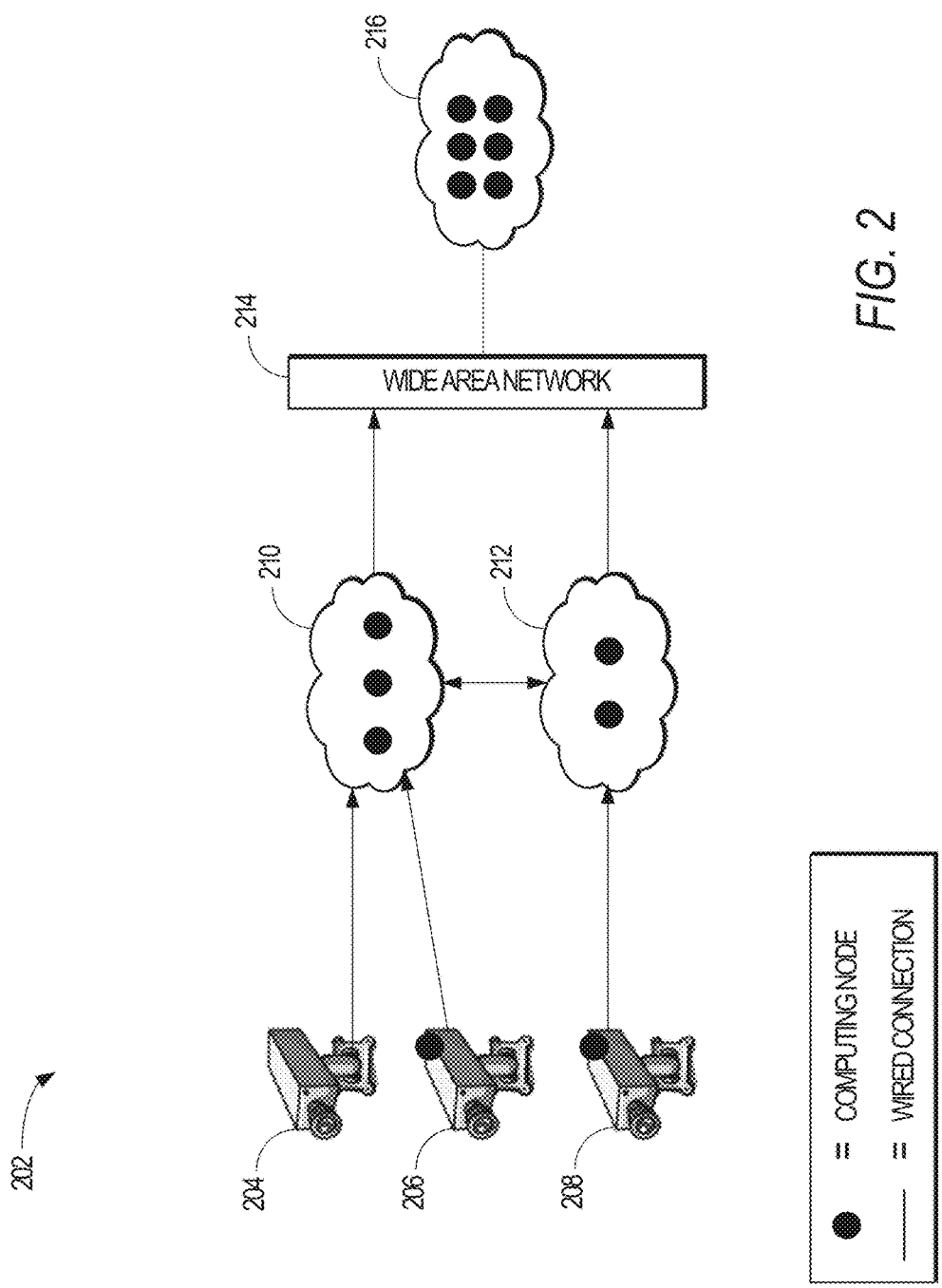
FIG. 2 is another example illustration of a network system, according to an example embodiment, where various cameras are sending streaming video into respective private clusters.

FIG. 2 is another example illustration of a network system 202, according to an example embodiment, where various cameras 204-208 are sending streaming video into respective private clusters 210-212. The video cameras 206-208 each include computing resources to process the streaming video. In addition, the private clusters 210-212 include computing resources to process the streaming video. As shown in FIG. 2, the private clusters 210-212 are communicatively coupled to a public cloud 216 via a wide area network 214 (e.g., the Internet), where the public cloud 216 includes computing resources greater than either the private cluster 210 or the private cluster 212.

To address these deficiencies, this disclosure defines "query planning" for a video query as choosing the most suited implementation for each of the query component along with setting the relevant knobs (e.g., the attribute values for the various configurable attributes of a video query). Query placement determines how the individual query components are placed across the available clusters (e.g., among the private clusters 104-110 and the public cloud 124). Query merging eliminates common components among queries that analyze the same camera stream. The disclosed systems and methods provide various embodiments to maximize the average accuracy of the video queries given available resources.

Figure 3:
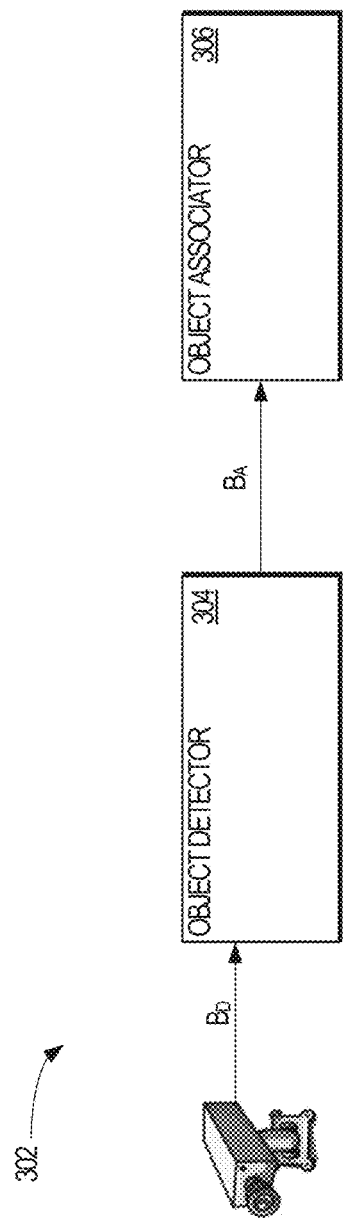
FIG. 3 illustrates one example of a video query in accordance with an example embodiment.

FIG. 3 illustrates one example of a video query 302 in accordance with an example embodiment. The video query 302 may be considered as an "object tracking" video query having two components: (1) a first component—an object detector 304—that detects objects in the video, while the second component—an object associator 306—associates newly detected objects to existing object tracks or starts new tracks. The components 302,304 have CPU demands, denoted as $C^D$ for the computing demands of the object detector 304 and $C^A$ for the computing demands of the object associator 306. The components 304,306 also have bandwidth demands, denoted as $B^D$ for the network bandwidth demands of the object detector 304 and $B^A$ for the network bandwidth demands of the object associator 306.

Figure 4:
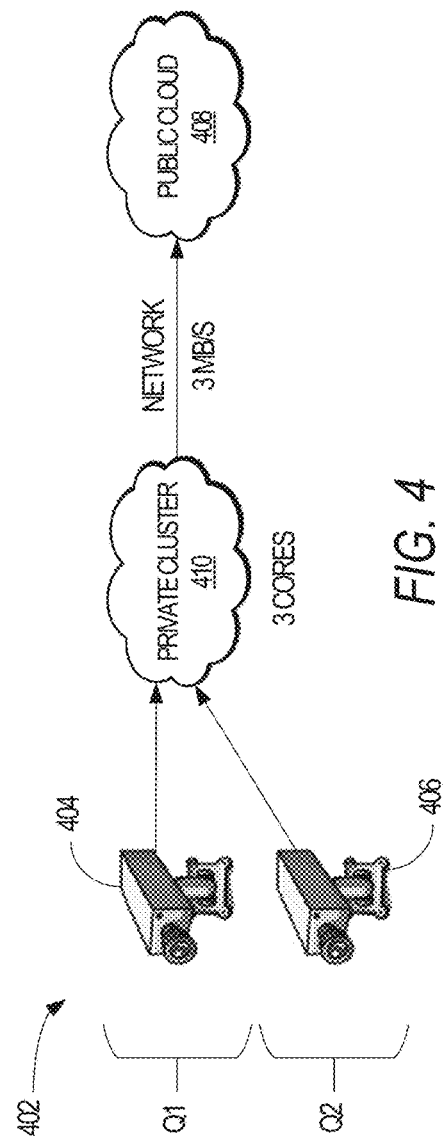
FIG. 4 illustrates one example of a cluster setup with two tracking queries in accordance with an example embodiment.

FIG. 4 illustrates one example of a cluster setup 402 with two tracking queries $Q_1,Q_2$ in accordance with an example embodiment. The tracking queries $Q_1,Q_2$ may each be instantiated on two different cameras, camera 404 and camera 406, respectively, where the cameras 404,406 provide video streams to a private cluster 410. In one embodiment, the private cluster 410 has three cores while the public cloud 408 has 40 cores. In the embodiment illustrated in FIG. 4, each camera 404,406 is not configured with computing resources. In addition, the private cluster 410 has a 3 Mb/s link to the public cloud 408, and each camera 404,406 has a dedicated 3 Mb/s link to the private cluster 410.

In the embodiment illustrated in FIG. 4, presume that the only configurable knob in the query plans is the frame resolution, and that both $Q_1$ and $Q_2$ have the same choice of plans. Table 1, below, presents the various query plans of the tracking queries $Q_1$ and $Q_2$.

TABLE 1

| Query Plan | $B^D$ | $B^A$ | $C^D$ | $C^A$ | Accuracy |
|---|---|---|---|---|---|
| $Q_{1080p}$ | 3 | 1.5 | 3 | 1 | 0.9 |
| $Q_{480p}$ | 1 | 1 | 2 | 2 | 0.6 |
| $Q_{240p}$ | 0.5 | 0.5 | 0.5 | 0.5 | 0.2 |

Each of the query plans $Q_1,Q_2$ may correspond to a tracker for tracking various objects in the video streams output by the cameras 404,406. As shown in Table 1, and in one embodiment, a query plan is defined by a particular combination of knob and resource demand values. Furthermore, a query plan may be predetermined from the knob value(s) and resource demand(s) associated with the particular combination of knob value(s). Thus, and in one embodiment, a query plan represents a unique combination of knob values and resource demands. In this manner, and in general, the query plans for a video query represent all the combinations of a given video query.

With a video resolution of 1080p, the trackers produce outputs having an accuracy of 0.9. In this context, accuracy corresponds to how well an object was detected and associated between frames of the received video stream. The accuracy value may range from 0 (representing the least accuracy) to 1 (indicating the highest possible accuracy). With a video resolution of 1080p, the CPU demands of the detector and associator ($C^D$ and $C^A$) are also high (e.g., three cores). Accuracy of the trackers is less at lower resolutions because the object detector 304 cannot find small objects and the object associator 306 cannot correlate objects between frames of the video stream. However, the trade-off in the accuracy is in other resources demanded by the components 304,306: the network bandwidth of the object detector 304 ($B'$), the network bandwidth of the object associator 306 ($B^A$), and the CPU demands ($C^D$ and $C^A$) all drop too As shown in Table 1, each video query $Q_1,Q_2$ has three query plan options corresponding to resolutions of the video streams output by the cameras 404,406: (1) a 1080p video resolution; (2) a 480p video resolution; or (3) a 240p video resolution. Furthermore, each of the query plans have three placement options: (1) both components in the private cluster 410; (2) the object detector 304 in the private cluster 410 and the object associator 306 in the public cloud 408; (3) and both the object detector 304 and the object associator 306 being in the public cloud 408. Accordingly, in our example, each query $Q_1,Q_2$ has nine possible configurations.

Using the values in Table 1, selecting a video frame resolution of 1080p results in the best accuracy for both $Q_1$ and $Q_2$. However, as the private cluster 410 is limited to three cores, a video frame resolution of 1080p cannot be selected for both video queries $Q_1,Q_2$. Furthermore, the components of both video queries $Q_1,Q_2$ cannot all be assigned to the public cloud 408 because of network bandwidth constraints.

In addition, if one video query's object detector, which requires three cores for analyzing 1080p video, is placed in the private cluster 410, the available network bandwidth of three Mb/s between the private cluster 410 and the public cloud 408 is still insufficient to support the aggregate data rate of 4.5 Mb/s ($B^D+B^A$ for 1080p video). Finally, the computing resources at the private cluster 410 is insufficient to support all the components locally. Hence, the query plans should be evaluated and determined jointly across the video queries $Q_1,Q_2$.

Using the values shown in Table 1, selecting $Q_{1,480p}$ and $Q_{2,100p}$ (or $Q_{1,1080p}$ and $Q_{2,480p}$) yields the best average accuracy of $$\frac{1.5}{2} = 0.75.$$

Figure 5:
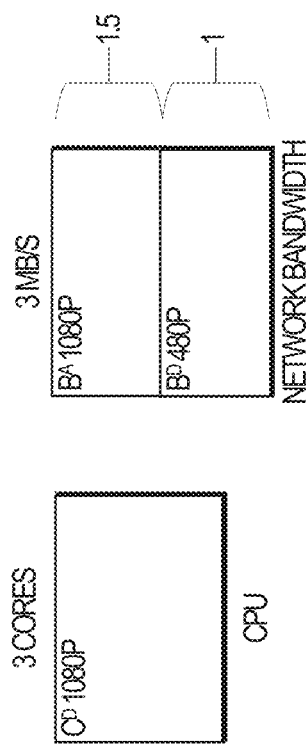
FIG. 5 illustrates one example of the utilization of computing and network bandwidth resources at the private cluster shown in FIG. 4, according to an example embodiment.

However, this combination of query plans is feasible only if the object detector of $Q_{2,1080p}$ is placed in the private cluster 410 and its corresponding object associator in the public cloud 408, while forwarding the video stream from the camera of $Q_{1,480p}$ to the public cloud 408 for executing both the object detector and the object associator of $Q_1$. FIG. 5 illustrates one example of the utilization of computing and network bandwidth resources at the private cluster 410 shown in FIG. 4, according to an example embodiment.

Figure 6:
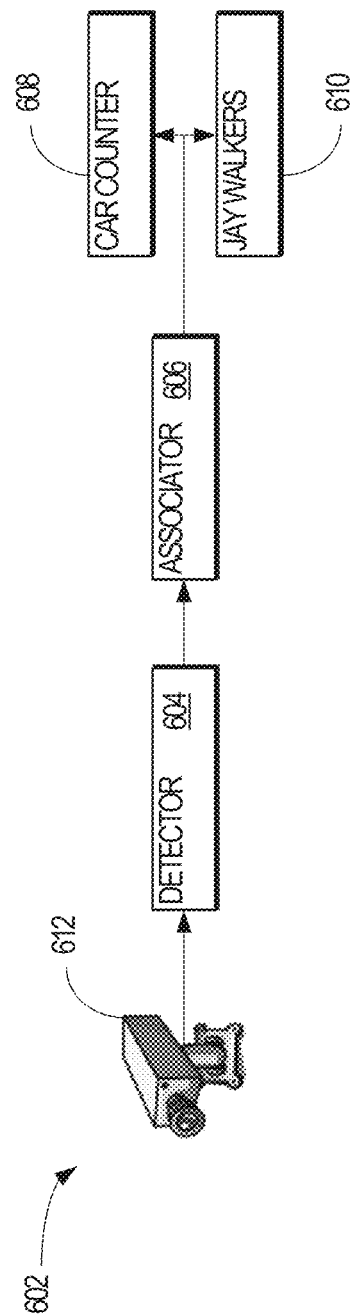
FIG. 6 illustrates one example where the components of video queries have been merged, according to an example embodiment.
Figure 7:
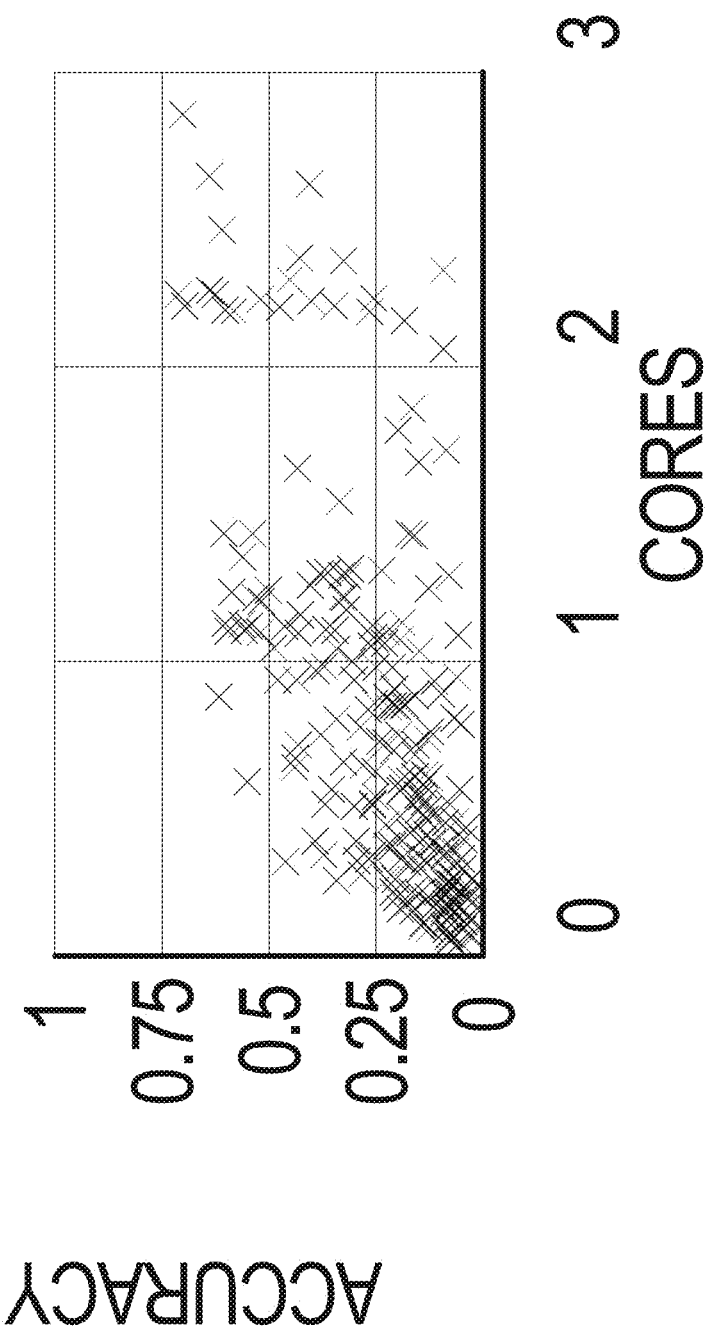
FIGS. 7-10 are graphs illustrating the results on a representative traffic camera video stream in a large city of the United States with an original bit-rate of 3 MB/s at 30 frames per second, according to example embodiments.

In some instances, components from one or more video queries may be merged, even where the components are being used to accomplish different objectives. FIG. 6 illustrates one example 602 where the components of video queries have been merged, according to an example embodiment. For FIG. 6, suppose that two new queries, $Q_3$ and $Q_4$, are using the same camera 612, and that both video queries $Q_3, Q_4$ use the same object detector 604 and the same object associator 606. In this example, the video query $Q_3$ uses object trajectories to count cars and the video query $Q_4$ uses people trajectories to identify jaywalkers. The object detector and object associator for each query $Q_3, Q_4$ can be merged such that only one of each module is executed. This merging reduces network bandwidth utilization and computing resources.

Despite the resource benefits of merging components, the evaluation and decision to merge components is non-trivial. This is same plan should be selected for the merged components. However, a high-accuracy plan for the video query $Q_3$ might result in a low accuracy value for the video query $Q_4$. Using the foregoing example, while background subtraction might result in a higher accuracy for car counting, a deep-neural-network (DNN)-based object detector may be needed for pedestrians. Thus, a merging of the various components should consider conflicts in accuracies and whether the merged plan with maximum accuracy is not too resource intensive.

In view of the foregoing considerations, the disclosed video query planner accounts for the following factors in maximizing video query accuracy (1) jointly planning for multiple queries using their resource-accuracy profiles; (2) considering component placement when selecting query plans to identify resource constraints; (3) accounting for multiple resources at the hierarchy of locations; and (4) merging common components across queries that process the same video stream. Achieving these properties is computationally complex owing to the combinatorial number of options.

There are many different implementations for video processing components. A common approach to detecting objects is to continuously model the background and subtract it to get the foreground objects. There are also other approaches based on scene positioning and deep neural networks (DNNs). Likewise, objects across frames can be associated to each other using different metrics such as distance moved (DIST), color histogram similarity (HIST), or scale-invariant feature transform (SIFT) features and speeded-up robust features (SURF). As disclosed herein, the different implementations for an object detector and for an object associator are equivalent in their functionality and abstraction (inputs and outputs). However, these components result in widely varying accuracy and resource demands.

The following discussion relates to quantifying the impact that the query plans—decisions on the implementations and knobs—have on the accuracy and resource demands of the video query. FIGS. 7-10 are graphs illustrating the results on a representative traffic camera video stream in a large city of the United States with an original bit-rate of 3 MB/s at 30 frames per second, according to example embodiments. For comparing the tracking performed by the traffic camera, a crowdsourcing technique was used to obtain empirical measurements of tracked objects (e.g., cars, pedestrians, bicycles, etc.). The empirical results from the crowdsourcing technique was then compared with the measurements obtained by the traffic camera.

In video recognition parlance, an object within a video sequence has a "track," which is a time-ordered sequence of boxes defining the object across video frames, and in each frame, an F1 score$\in[0,1]$ is calculated (the harmonic mean of precision and recall) between the box in the result obtained from crowdsourcing (e.g., the "ground truth") and the track generated by the tracker of the video query. Accuracy of the tracker is defined as the average of the F1 scores across all the frames of the video sequence. From FIG. 7 and FIG. 9 it is evident that 300 query plans produce outputs of widely-varying accuracies.

Figure 8:
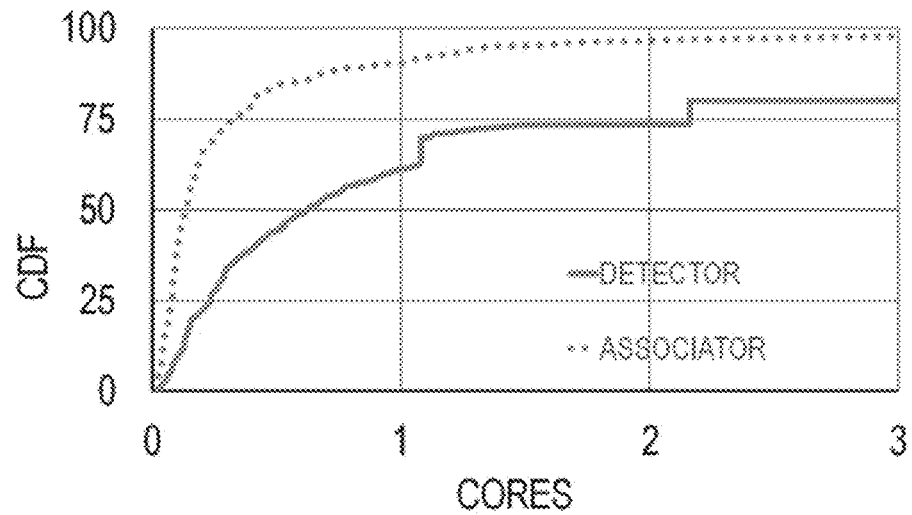

As discussed above, a query plan can have varying computing resource demands and network bandwidth demands. Video queries with background-subtraction based object detectors are typically less CPU intensive than DNN-based object detectors. Further, when components do not maintain state across frames (e.g., DNN-based object detectors), different frames can be processed in parallel across many cores to match a video's frame rate. FIG. 8 is a graph illustrating that the individual components—an object detector and an object associator—exhibit considerable variability in their CPU demand over the range of implementations and knobs. In some embodiments, accuracy is defined with regard to the entire video query and not individual components of the video query.

Figure 9:
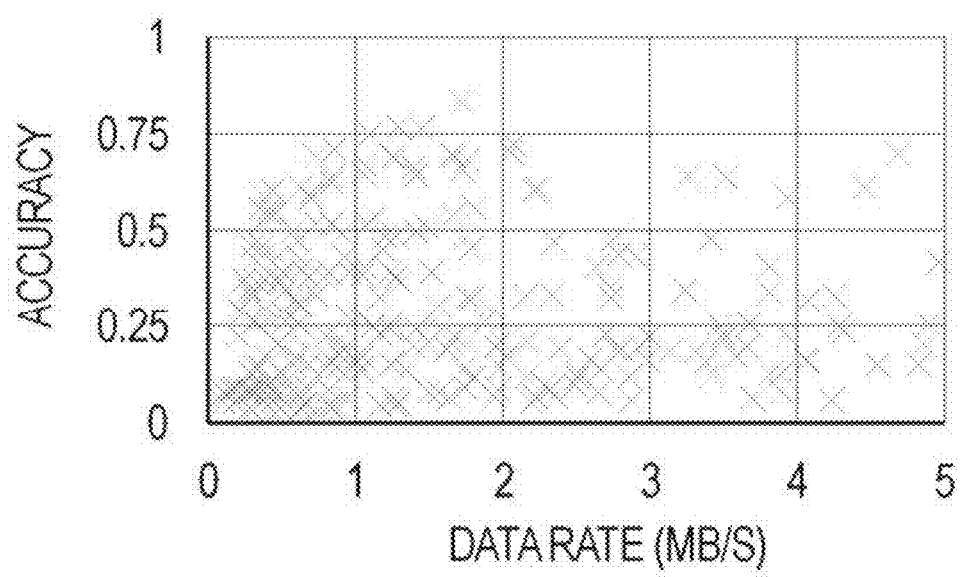

In addition to showing accuracy of the components, FIG. 9 further illustrates the sum of output data rates of the object detector and object associator. For discussion purposes, FIG. 9 excludes an input stream rate for either the object detector or the object associator.

Figure 10:
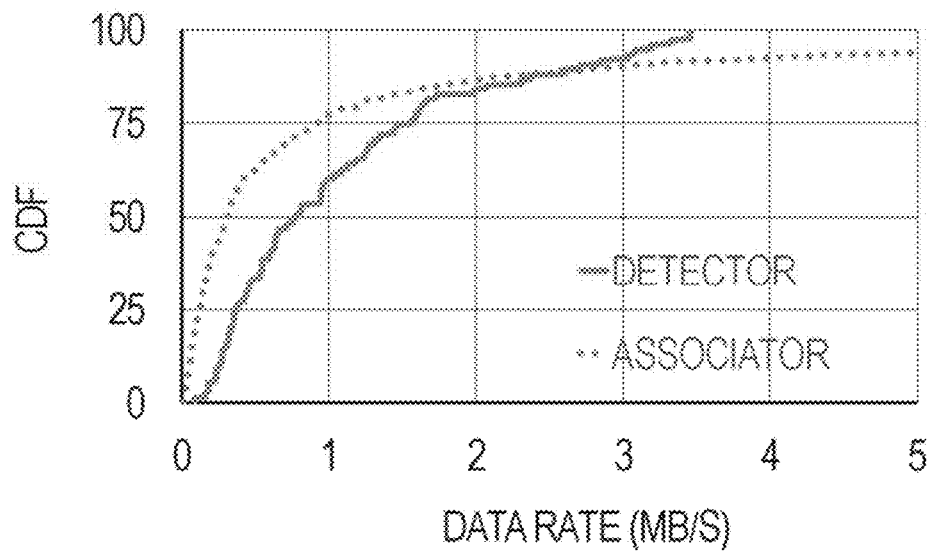

FIG. 10 is a graph illustrating the Common Data Format (CDF) output rates of the object detector and the object associator. As known to one of ordinary skill in the art, CDF is a conceptual data abstraction for storing, manipulating, and accessing multidimensional data sets. The basic component of CDF is a software programming interface that is a device-independent view of the CDF data model. In addition to the actual data being stored, CDF also stores user-supplied descriptions of the data, known as metadata. This self-describing property allows CDF to be a generic, data-independent format that can store data from a wide variety of disciplines.

As shown in FIG. 10, the data rates vary across different implementations and knob values from a few hundred Kb/s upwards to 5 Mb/s. In some embodiments of the query plans, when the components fail to detect and track the objects, the components output less data than if the components successfully detected and tracked the objects.

The network bandwidth demands of the components depends, in some instances, on the placement of the components. If both components (or all components where more than two components are included in a video query) are placed in the same cluster (e.g., the private cluster 410), the output from the object detector remains within the confines of the private cluster.

Figure 11:
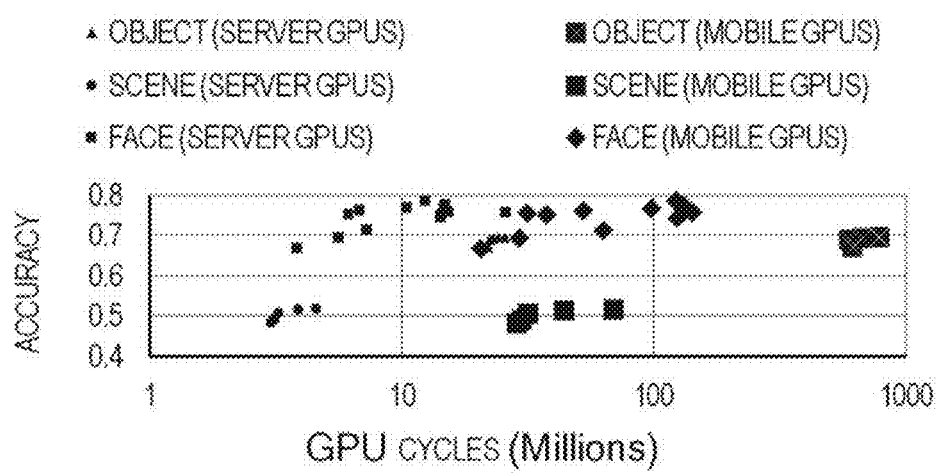
FIG. 11 is a graph plotting the resource-accuracy profile for different deep neural network-based recognizer implementations, according to example embodiments.

Resource-accuracy profiles are one characteristics of video queries including license plate readers, DNN recognizers, and other such video queries. FIG. 11 is a graph plotting the resource-accuracy profile for different DNN-based recognizer implementations, according to example embodiments. In FIG. 11, the DNN-based recognizers have been implemented on a variety of graphics processing units (GPUs). The DNN-based recognizers that were measured include scene recognizers, face recognizers, and object recognizers. One example of a scene recognizer is disclosed in Zhou et al., "Learning Deep Features for Scene Recognition Using Places Database," in Proceedings of the liventy-eighth Annual Conference on Neural Information Processing Systems (NIPS) (2014), which is hereby incorporated by reference in its entirety. One example of a face recognizer is disclosed in Taigman et al., "Face: Closing the Gap to Human-Level Performance in Face Verification," in Proceedings of IEEE Conference on Computer Vision and Pattern Recognition (CVPR) (2014), which is hereby incorporated by reference in its entirety. One example of an object recognizer is disclosed in Simonyan et al., "Very Deep Convolutional Networks for Large-Scale Image Recognition," in Proceedings of the International Conference on Learning Representations (ICLR) (2015), which is hereby incorporated by reference in its entirety. Examples of GPUs that can instantiate the various recognizers include, but are not limited to, server-class GPUs (e.g., the NVIDIA® Tesla® K20), mobile GPUs (e.g., the NVIDIA® Tegra® K1), and other such GPUs now known or later developed.

In approaching the video query planning problem, the video query planning is treated as an optimization problem to highlight its computational intractability and the usefulness of an efficient heuristic solution.

The following terminology and symbols is instructive to understanding the complexities and technicalities of the video query planning embodiments. In this regard, let $N_i$ represent the set of all plans of query i, e.g., all combinations of possible knob values and component implementations. As discussed above, examples of "knobs" include a frame resolution attribute and selecting the implementation for the object detector component. Furthermore, let $A_{i,j}$ represent the accuracy of plan j for the video query i. The disclosed resource-accuracy profiler generates the accuracy and resource demands for each plan (discussed below), both of which are independent of where the video query's components are placed.

In addition, let $L_i$ represent the set of all possible placements of components of query i; if the query has $n_c$ components and each component can be placed in one of $n_s$ clusters, there are total of $n_s^{n_c}$ placement choices for the query.

Each cluster (e.g., the private cluster 410 of FIG. 4) is modeled as an aggregate bin of resources and the placement of query components is determined across the clusters. Each cluster is further modeled as having one or more computing cores along with network uplink and downlink bandwidths. In this regard, let $C_l$ be the capacity of resource l and $D_{i,j,k}^l$ be the demand on resource l from query i when running with plan j and placement k.

Table 2, below, provides a listing of the notations used in the following description.

TABLE 2

| Notation | Description |
| --- | --- |
| $N_i$ | Set of all plans of query i, |
| $L_i$ | Set of all placements of query i. |
| $A_{i,j}$ | Accuracy of plan j of query i. |
| $S_{i,j,k}$ | Cost of query i when using plan j and placement k. |
| $D_{i,j,k}^l$ | Demand on resource l of query i when using plan j and placement k. |
| $C_l$ | Capacity of resource l. |
| $X_{i,j,k}$ | Binary variable equal to 1 if, and only iff, (iff) query i is using plan j and placement k. |

In this disclosure, each combination of a resource type (e.g., a network uplink) and a computing resource (e.g., the video camera 110 of FIG. 1) is referred to as a "resource" l. With reference to FIG. 3 and FIG. 4 as examples, placing the object detector 304 at the private cluster 410 and the object associator 306 at the public cloud 408 uses the following resources: uplink of the camera 404 and downlink of the private cluster 410 (for the video), cores and network bandwidth uplink of the private cluster 410 (running the object detector 304 and communicating its output), network bandwidth downlink and computing cores of the public cloud 408 (e.g., ingesting the output of the object detector 304 and running the object associator 306).

In addressing the video query planning problem, the problem can be formulated as the following Binary Integer Program (BIP):

$$\max \Sigma_i A_{i,j} \cdot x_{i,j,k} \quad \text{(eq. 1)}$$

$$s.t., \forall l: \Sigma_{i,j,k} D_{i,j,k}^l \cdot x_{i,j,k} \leq C_l \quad \text{(eq. 2)}$$

$$\forall i: \Sigma_{j,k} x_{i,j,k} = 1 \quad \text{(eq. 3)}$$

$$x_{i,j,k} \in \{0,1\} \quad \text{(eq. 4)}$$

where $x_{i,j,k}$ is a binary variable equal to 1 iff query i executes using plan j and placement k. The optimization maximizes the sum (equivalently, average) of query accuracies (Eq. 1), while meeting the capacity constraint for all resources l (Eq. 2). As explained previously, video query plans and component placements that do not fit within the available resources are deemed infeasible. Equation 3 restricts exactly one query plan and placement for selection for each query. In this regard, each (plan j, placement k) pair for a video query is defined as a configuration.

In solving the foregoing optimization problem, the optimization space can be relatively large. In particular, with $n_s$ number of clusters (e.g., private clusters), $n_c$, number of components in each video query, $n_p$ number of video query plans for each video query, and $n_q$ number of video queries, the size of the optimization space is $(n_s^{n_c} \cdot n_p)^{n_q}$. For example, with 1000 queries, each with 5 components and 100 plans, and three private clusters, the optimization problem would have to consider approximately $10^{4000}$ options.

The foregoing formulation of the problem can be further extended to handle query merging. In one embodiment of query merging, only the video queries that process video streams from the same camera are selected for merging; thus, logically, all of the video queries using the same video camera are grouped into super-queries and formulated into the same program as above but at the level of the super-queries. The accuracy and demand of a super-query are then aggregated across of the video queries that are grouped into the super-query.

The disclosed systems and methods address this optimization space by efficiently navigating the large space of configurations—potential query plans and placements of components—and reducing the combinatorial complexity. In implementing the solution to this problem, the disclosed systems and methods generally follow four steps:

1) Define a resource cost for a configuration, a scalar metric which aggregates multiple resource demands across many clusters. Defining a resource cost allows a comparison of different query configurations;

2) Starting from configurations with determined lowest costs, the disclosed heuristic greedily switches to configurations that have a high efficiency; e.g., improve the video query accuracy the most with low additional cost;

3) Optimizing the running time of the heuristic by identifying a smaller subset of promising query configurations in its Pareto band; and, 4) Merging queries containing common components processing the same camera streams.

The various resource demands of the determined configurations, $D_{i,j,k}^l$, and accuracies of the plans, $A_{i,j}$, are estimated before submitting the video query to the scheduler by the resource-accuracy profiler.

In deciding between two configurations, e.g. configuration $c_0$ and $c_1$, the accuracies and resource demands between these configurations are compared. However, because the video query leverages multiple clusters and there are several types of resources, it is not straightforward to compare resource demands. Therefore, this disclosure defines a resource cost that aggregates demand for multiple resources into a single value. The following definition is used to define a resource cost: the cost of a placement k of a query plan j for query i is its dominant resource utilization:

$$S_{i,j,k} = \max_l \frac{D_{i,j,k}^l}{C_l}, \text{ where} \qquad \text{(eq. 5)}$$

S is a scalar that measures the highest fraction of resources l needed by the query i across resource types (e.g., computing resources, network bandwidth uplink, network bandwidth downlink) and clusters (e.g., video camera(s), private cluster(s), public cloud).

One particular property of the dominant utilization metric S is that, by normalizing the demand D relative to the capacity C of the clusters, it avoids a lopsided drain of any single resource at any cluster. In addition, by being dimensionless, the dominant utilization metric extends to multiple resources. In an alternative embodiments, $S_{i,j,k}$ is defined using the sum of resource utilizations (e.g., $\Sigma_l$ instead of $\max_l$) or the absolute resource demand.

In order to maximize average accuracy, efficiently utilizing the limited resources is desirable. One principle employed in the pursuit of this feature is the allocation of more resources to video queries that can achieve higher accuracy per unit resource allocated compared to other video queries. In furtherance of this feature, an efficiency metric is defined that relates the achieved accuracy to the cost of the query.

The disclosed greedy heuristic starts with assigning the video query configuration with the lowest cost to each video query and greedily considers incremental improvements to all the video queries to improve the overall accuracy. When considering switching query i from its current plan j and placement k to another plan $j_0$ and placement $k_0$, the efficiency of this change is defined as the improvement in accuracy normalized by the additional cost required. Specifically:

$$E_i(j', k') = \frac{A_{i,j'} - A_{i,j}}{S_{i,j',k'} - S_{i,j,k}} \qquad \text{(eq. 6)}$$

Defining $E_i(j', k')$ in terms of the differences (e.g., a "delta") in both accuracy and cost is one embodiment for the gradient-based search heuristic. Alternative embodiments include using only the new values, e.g., only $A_{i,j}$, and/or $S_{i,j',k'}$, as discussed below.

The pseudocode for the greedy heuristic is provided below. As used in the pseudocode, U represents the set of all (i,j,k) tuples of all video queries i, the available plans j, and the placements k. The objective of the greedy heuristic is to assign to each video query i a plan p, and placement $t_i$ (shown in lines 1-3).

```
1:      U
(Set of all (i,j,k) tuples of all queries i and the available
plan j and placements k)
2:      p_i
(Plan assigned to query i)
3:      t_i
(Placement assigned to query i)
4:      for all query i do
5:          (p_i, t_i) = arg min_(j,k) S_{i,j,k}
(Cost S as defined in eq. 5)
6:      for each resource l: update R_l
7:      while U ≠ ∅ do
8:          U' ← U − {(i, j, k) where ∃l: R_l < D_{i,j,k}^l}
9:          remove (i,j,k) from U if A_{i,j,k} ≤ A_{i,p_i,t_i}
10:         (i*, j*, k*) = arg max_(i,j,k∈U') E_i(j, k)
11:         p_{i*} ← j*
12:         t_{i*} ← k*
13:         for each resource l: update R_l based on D_{i*,p_{i*},t_{i*}}^l
```

In the foregoing pseudocode, the heuristic first assigns each query i the plan j and placement k with the lowest cost $S_{i,j,k}$ (e.g., lines 4-5). After that, the heuristic iteratively searches across all plans and placements of all queries and selects the query i*, the corresponding plan j*, and the corresponding placement k* with the highest efficiency (e.g., lines 7-13). The heuristic then switches the video query i* to its new plan j* and the placement k*, and repeats until no query can be upgraded any more (e.g., either due to insufficient remaining resources or that there are no more plans with higher accuracies).

In each iteration, the configurations that are considered are those that that fit in the remaining resources $R_l$ by constructing U' (e.g., line 8). It should be noted that infeasible configurations may not be removed from U completely as these infeasible configurations may be determined as being feasible later as the heuristic moves components across clusters by changing configurations of video queries.

One subtle feature of the disclosed heuristic is that in each iteration, the heuristic removes those options from U that reduce a selected video query's accuracy relative to its currently assigned plan and placement (e.g., line 9). Such an explicit removal is beneficial because, even though the change in accuracy of the removed options would be negative, those options may also have negative difference in dominant utilization (e.g., $S_{i,j,k}$), thus making the efficiency positive and potentially high. In alternative embodiments, this check may not be implemented, but removing this check may lower the eventual accuracy as well as increasing the running time of the heuristic.

In one embodiment, the query plans and/or placements are applied when the heuristic fully completes. In an alternative embodiment, the query plans and/or placements are applied upon each completion of a given iteration of the heuristic.

To speed up the heuristic, the size of the exponentially-large set U is reduced by explicitly filtering out query configurations that have low accuracy and high resource demand. For example, the configurations in the bottom-right corners of the tracker video query in FIG. 7 and in FIG. 9 are unlikely be selected by the heuristic.

This disclosure builds upon the concept of Pareto efficiency to first identify the Pareto boundary of query configurations. In general, Pareto efficiency refers to a state of allocation of resources from which it is impossible to reallocate so as to make any one individual or preference criterion better off without making at least one individual or preference criterion worse off.

Figure 12:
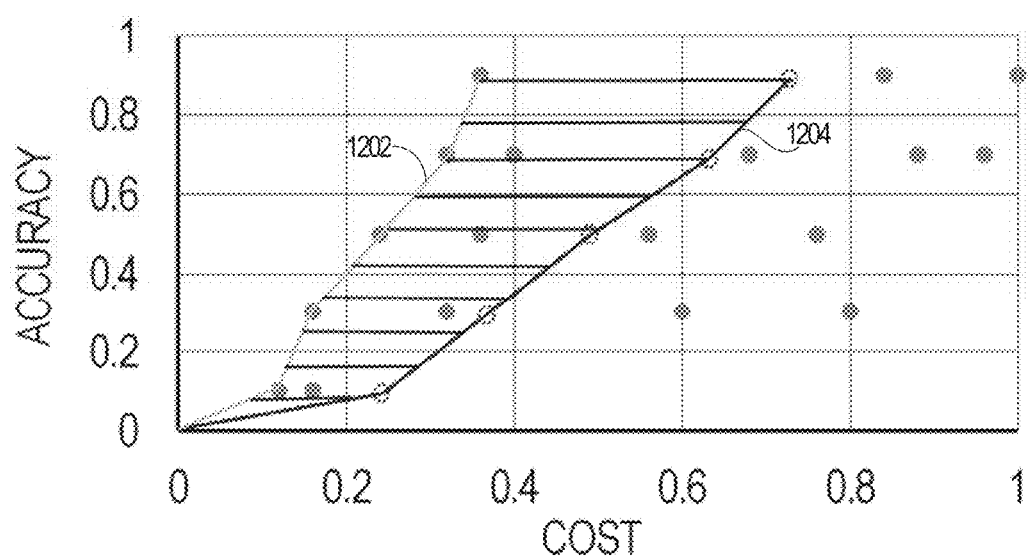
FIG. 12 is an example graph that plots an illustrative accuracy-cost space for a video query, where the accuracy-cost space includes a defined Pareto band, according to an example embodiment.

FIG. 12 is an example graph that plots an illustrative accuracy-cost space for a video query with the left upward line 1202 being the Pareto boundary. For a particular video query i, a video query configuration c is on the Pareto boundary if there does not exist any other configuration with a lower cost and higher accuracy. For every point not on the Pareto boundary, there is at least one point on the boundary that is better in both accuracy (e.g., a higher accuracy value) and cost (e.g., a lower cost value).

However, limiting the search for configurations to only the configurations on the Pareto boundary can be problematic when optimizing for multiple video queries. Note that, in one embodiment, the resource cost S is defined in terms of the resource capacities and not resource availabilities. As a result, when the greedy heuristic performs its decisions iteratively and evaluates a video query, all the placement options on the Pareto boundary for the video query may result in being infeasible with the available resources because earlier assigned video queries may have used up the capacities (e.g., line 8 in disclosed pseudocode above).

Therefore, to reduce the size of set U without unduly restricting the foregoing heuristic, a "band" is defined relative to the Pareto boundary, which this disclosure refers to as a Pareto band. The Pareto band is defined by the Pareto boundary and a second boundary, defined as the δ-boundary. In defining the δ-boundary, it is a boundary that includes those points (Sc, a) for all points (c, a) on the Pareto boundary. In FIG. 12, a δ-Pareto boundary 1204 is defined where δ=2. Defining the width of the Pareto band relative to the Pareto boundary provides a cluster of placements with comparative costs. The heuristic thus searches among the video query configurations within the Pareto band (e.g., set U as defined above).

When there are multiple queries processing the same video camera feed with a common prefix in their pipeline, there is an opportunity to eliminate the execution of redundant components. Reducing the execution of redundant components presents a technical benefit of improving the overall performance and/or accuracy of a given set of video queries. Video queries that include redundant and/or common components are referred to as a peer set.

One challenge in merging video queries that belong to the peer set is deciding the implementation and knobs for the merged components. In addition, the decision to merge not only applies to the peer queries involved, also implicates the aggregate quality for all queries in the system as the planning and placement of other queries can also be affected. A further challenging in merging video queries is that the possible merging combinations grows exponentially for a peer set of N queries (e.g., each pair of queries in a peer set can be merged).

The foregoing heuristic is efficient because it considers the Pareto band of configurations for each query independently. However, there are challenges in searching for good merged configurations because the search could be potentially computationally expensive. Thus, to reduce the search space, the following two decisions are performed when considering merging two queries:

(1) Either all of the common components for a set of video queries are merged, or nothing is merged. For example, and with reference to FIG. 6, either the object detector 604 or the object associator 606 are both merged, or neither of these components 604, 606 are merged. In an alternative embodiment, only the object detector 604 or only the object associator 606 is merged.

(2) Where there are no components in common, a search is not performed on all possible implementation and knob values for those components that are not common (e.g., the car counter module 608 and the jay walker counting module 610 of FIG. 6). In this regard, the disclosed heuristic determines values for these distinct components, and those values are considered in evaluating the overall value of merging.

To accommodate the merging of common components, the heuristic may be modified at lines 11-12. In particular, when considering switching to configuration $(p_i^*, t_i^*)$ of query i*, it is determined whether to merge this query with all subsets of its peer queries. More particularly, let R be one of the subsets of i*'s peer queries. All video queries in R are merged with i and the $(p_i^*, t_i^*)$ configuration is applied to all components in i*. Any remaining components in the merged query (e.g., those that are not in i*) remain in their current video query plan and placement. For each such merged video query, an efficiency metric E is determined relative to all peer queries of i*. In one embodiment, the efficiency metric E is determined as a ratio of the aggregate increase in accuracy to the aggregate increase in resource cost.

In estimating accuracy and per-component resource demands (e.g., computing costs and network bandwidth utilization), a resource-accuracy profiler is configured to determine these values. In one embodiment, the resource-accuracy profiler does not determine the placement of the various components. In additional and/or alternative embodiments, the resource-accuracy profiler is configured to determine such placements.

In one embodiment, the resource-accuracy profiler estimates the video query accuracy by running the video query on a labeled dataset obtained via a crowdsourcing technique or by labeling the dataset using a predetermined and/or preprogrammed video query plan known to be resource-intensive but configured to produce highly accurate outputs. In this regard, when a user submits a new video query, the resource-accuracy profiler begins profiling it while submitting it to a scheduler with the default query plan.

Since a video query can have thousands of video query plans that have to be executed on the labeled videos, one objective in profiling is to minimize the computing resource (e.g., CPU cycles) demand of the resource-accuracy profiler.

In accomplishing this objective, the following features are implemented on the resource-accuracy profiler: (1) eliminating common sub-expressions by merging multiple query plans; and (2) caching intermediate results of video query components.

Assume that a tracking video query D→A has two components, and that each component has two implementations: $D_1D_2$ and $A_1A_2$. The resource-accuracy profiler thus profiles four video query plans: $D_1A_1$, $D_1A_2$, $D_2A_1$, and $D_2A_2$. If each video query plan is executed separately, implementations $D_1$ and $D_2$ would run twice on the same video data. However, merging the execution of plans $D_1A_1$ and $D_1A_2$ can avoid the redundant executions. In one embodiment, the merging is performed recursively and in a similar fashion as to the merging of components in video queries as discuss above.

In one embodiment, the video query plans are merged into a single video query plan. However, in some instances, merging the video query plans into a single video query plan requires a large number of concurrent computing resources, which may or may not be available. Where such resources are not available, the merging is performed by leveraging the caching of intermediate results. In one embodiment, all of the results of profiling the video query plans are cached. However, in some instances, caching all of the results places a high requirement on available storage space. For example, in one empirical analysis performed, executing the resource-accuracy profiler on a video query tracker for a 5-minute traffic video required storage space on the order of 78× the size of the original video to cache all of the results.

Accordingly, in one embodiment a caching budget is assigned to each video query of the video queries to be profiled. In addition, and in another embodiment, the outputs of those components that take a longer amount of time to generate (e.g., meet or exceed a predetermined time threshold) are preferentially cached. Moreover, the outputs of those components that are used frequently may also be preferentially cached. Examples of such components include those with many downstream components, each with many implementations and knob (e.g., attribute value) choices. A metric is encoded for each intermediate result defined as:

$$M = n \times \frac{T}{S}, \quad \text{(eq. 7)}$$

where
  M=the intermediate metric being determined;
  n=the number of times a particular output will be accessed;
  T=the time taken to generate the output; and
  S=the size of the resulting output.

The resource-accuracy profiler uses the caching budget for intermediate outputs with a higher value of the M metric. One technical benefit of the disclosed caching budget and encoded metric is a reduction in the number of CPU cycles used in caching and merging one or more video queries. For example, in one empirical analysis performed, given a cache budget of 900 MB per query per machine, it was observed that the resource-accuracy profiler consumed 100× fewer CPU cycles.

The one or more video queries may be submitted using different computer programming and/or scripting languages, such as JavaScript Object Notation (JSON). For example, the video queries may be submitted as a pipeline of components specified in JSON. Each component takes a time-ordered sequence of events (e.g., frames) and produces outputs (e.g., objects). The JSON for a given video query lists the knobs as well as the implementation options. To monitor, control, and/or distribute the components of a video query, a given organization (e.g., an organization having one or more private clusters, one or more video cameras, etc.) executes a global manager. In this regard, the global manager executes the disclosed planner (e.g., the foregoing heuristic), the resource-accuracy profiler, and the scheduler, which schedulers the execution of the various video queries for the resource-accuracy profiler. In addition, each private cluster within the organization executes a local manager, which is configured to communicate and accept instructions (e.g., be managed by) the global manager. Accordingly, the global manager selects the appropriate video query plans as well as placing the different components of the organization's multiple queries at the various resources (e.g., at the video camera(s), the private cluster(s), and/or public cloud). The local manager at each private cluster monitors the components running locally and reports resource usages to the global manager.

Figure 13:
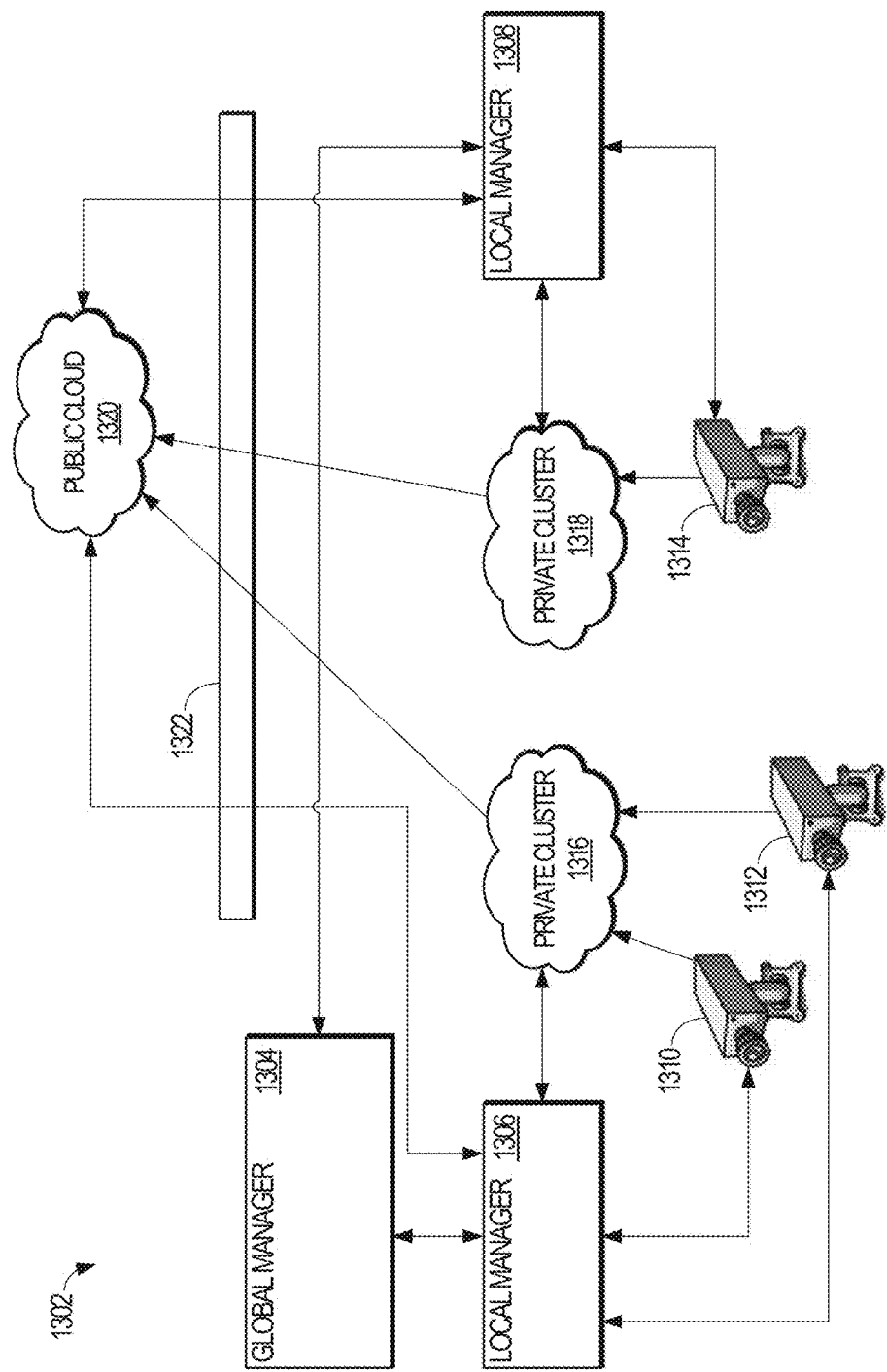
FIG. 13 illustrates a networked system where a global manager is configured to instruct local managers for the execution of determined video query plans, in accordance with an example embodiment.

FIG. 13 illustrates a networked system 1302 where a global manager 1304 is configured to instruct local managers 1306-1308 for the execution of determined video query plans, in accordance with an example embodiment. In FIG. 13, the computing resources may include one or more video cameras 1310-1314, one or more private clusters 1316-1318, and a public cloud resource 1320. The video cameras 1310-1312 are communicatively coupled to the private cluster 1316 and transmit one or more video streams to the private cluster 1316 via one or more wired and/or wireless networks (e.g., 3G, LTE, 802.11b/g/n, etc.) The video cameras 1310-1312 are also communicatively coupled to a public cloud resource 1320 via a WAN (e.g., the Internet) 1322. Similarly, a video camera 1314 is communicatively coupled to a private cluster 1318 and communicates one or more video streams to the private cluster 1318 via one or more wired and/or wireless connections. The private cluster 1318 may also be communicatively coupled to the public cloud resource 1320 via the WAN 1322.

Each of the video cameras 1310-1314 and the private clusters 1316-1318 are managed by respective local managers 1306-1308. The local managers 1306-1308 distribute and provide instructions as to which of the computing resources (e.g., the video cameras 1310-1312, private clusters 1316-1318, and/or the public cloud resource 1320) are to execute components of one or more video queries (e.g., the object detector component 604 and/or the object associator component 606 of FIG. 6.) The local managers 1306-1308 may also instruct the video cameras 1310-1314 as to the quality and/or resolution of the video stream that the video cameras 1310-1314 are to provide (e.g., in accordance with the video query plan determined by the global manager 1304). Accordingly, the local managers 1306-1308 receive instructions from a global manager 1304 that instructs how the local managers 1306-1308 are to distribute the components of the video queries using the computing resources shown in FIG. 13.

Figure 14:
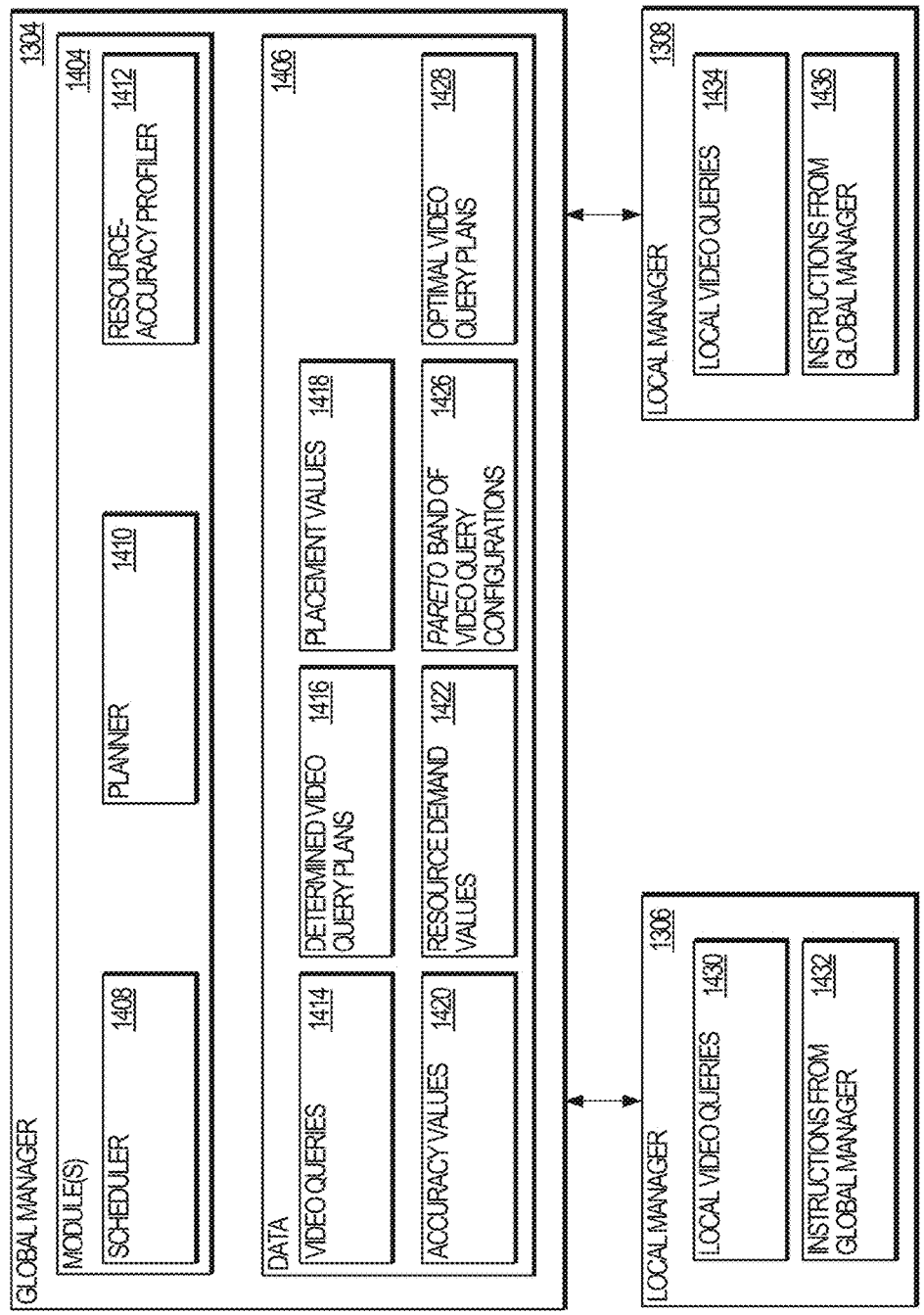
FIG. 14 illustrates an example of the global manager of FIG. 13, in accordance with an example embodiment.

FIG. 14 illustrates an example of the global manager 1304 of FIG. 13, in accordance with an example embodiment. In one embodiment, the global manager 1304 communicates with one or more local managers 1306-1308 using one or more communication interfaces (not shown). In addition, the local managers 1306-1308 communicate with the global manager 1304 and inform the global manager 1304 of the video queries associated with each local manager. Thus, in this regard, the local manager 1306 may be associated with one or more local video queries 1430 and the local manager 1308 may be associated with one or more video queries 1434. As discussed above, each of the video queries 1430-1434 may include various components and include one or more video plan for configuring the various components.

In one embodiment, the global manager 1304 includes one or more processor(s) (not shown), one or more communication interface(s) (not shown), and a machine-readable medium that stores computer-executable instructions for one or more module(s) 1404 and data 1406 used to support one or more functionalities of the various module(s) 1404.

The various functional components of the global manager 1304 may reside on a single device or may be distributed across several computers in various arrangements. The various components of the global manager 1304 may, furthermore, access one or more databases to retrieve data 1406 and each of the various components of the global manager 1304 may be in communication with one another. Further, while the components of FIG. 14 are discussed in the singular sense, it will be appreciated that in other embodiments multiple instances of the components may be employed.

The one or more processors of the global manager 1304 may be any type of commercially available processor, such as processors available from the Intel Corporation, Advanced Micro Devices, Texas Instruments, or other such processors. Further still, the one or more processors may include one or more special-purpose processors, such as a Field-Programmable Gate Array (FPGA) or an Application Specific Integrated Circuit (ASIC). The one or more processors may also include programmable logic or circuitry that is temporarily configured by software to perform certain operations. Thus, once configured by such software, the one or more processors become specific machines (or specific components of a machine) uniquely tailored to perform the configured functions and are no longer general-purpose processors.

The one or more communication interfaces are configured to facilitate communications between the global manager 1304 and the local managers 1306-1308. The one or more communication interfaces may include one or more wired interfaces (e.g., an Ethernet interface, Universal Serial Bus (USB) interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces. Accordingly, the global manager 1304 may communicate with the local managers 1306-1308 through one or more local networks, external networks, or combinations thereof.

The machine-readable medium includes various module(s) 1404 and data 1406 for implementing the functionalities of the global manager 1304. The machine-readable medium includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the module(s) 1404 and the data 1406. Accordingly, the machine-readable medium may be implemented as a single storage apparatus or device, or, alternatively and/or additionally, as "cloud-based" storage systems or storage networks that include multiple storage apparatus or devices. In one embodiment, the machine-readable medium excludes signals per se.

In one embodiment, the module(s) 1404 are written in a computer-programming and/or scripting language. Examples of such languages include, but are not limited to, C, C++, C#, Java, JavaScript, Perl, Python, or any other computer programming and/or scripting language now known or later developed.

With reference to FIG. 14, the modules 1404 of the global manager 1304 are configured to determine an optimal configuration of the components of one or more video queries, including placement locations, knob/attribute selections, plan selections, and whether one or more components can be (or should be) merged. To perform these and other operations in determining the optimal configurations of the video queries, the modules 1404 include, but are not limited to, a scheduler 1408, a planner 1410, and a resource-accuracy profiler 1412. While the global manager 1304 may include alternative and/or additional modules or applications (e.g., a networking module, a printing module, an operating system, a web server, various background and/or programmatic services, etc.), such alternative and/or additional modules are not germane to this disclosure and the discussion of such is hereby omitted for brevity and readability.

The data 1406 referenced and used by the module(s) 1404 include various types of data in support of determining the optimal configurations of the various video queries. In this regard, the 1406 includes, but is not limited to, one or more video queries 1414 (which may include the local video queries 1430-1434), one or more determined video query plans 1416 associated with the video queries 1414, one or more placement values 1418 for placing the components of the video queries 1414, one or more accuracy values 1420 determined from the video queries 1414, one or more resource demand values 1422, one or more Pareto band of video query configurations 1426 (e.g., each Pareto band being associated with a corresponding video query 1414), and one or more optimal video query plans 1428 determined using the Pareto band of video query configurations 1426.

As briefly mentioned above, the global manager 1304 may obtain the video queries 1414 from the local manager 1306-1308. Thus, the video queries 1414 may be a combination of one or more of the local video queries 1430 and one or more of the local video queries 1434. As described above, the video queries 1414 may be communicated as JSON objects to the global manager 1304.

In one embodiment, the global manager 1304 evaluates the video queries using all of the video queries as the set of video queries to evaluate. In another embodiment, the local video queries associated with a particular local manager (e.g., the local video queries 1430 or the local video queries 1434) are selected as the set of video queries 1414 to evaluate.

Each of the video queries 1414 are associated with one or more video query plans. In one embodiment, the global manager 1304 determines the accuracy value and resource demand values for each query plan associated with a particular video query. In one embodiment, the resource-accuracy profiler 1412 is configured to determine the accuracy values 1420 and the resource demand values 1422 for each of the query plans associated with a particular video query of the video queries 1414. As explained above, the resource-accuracy profiler 1412 may determine the accuracy values 1420 and the resource demand values 1422 by executing each video query of the video queries 1414 on a labeled dataset obtained via a crowdsourcing technique or by labeling the dataset using a predetermined and/or preprogrammed video query plan known to be resource-intensive but configured to produce highly accurate outputs. In this regard, when one of the local managers 1306,1308 submits a video query from the local video queries 1430,1434, the resource-accuracy profiler 1412 begins profiling it while submitting it to a scheduler 1408 with the default query plan.

As explained previously, a video query can have thousands of video query plans that have to be executed on labeled videos. Accordingly, the disclosed embodiments of the resource-accuracy profiler 1412 attempt to minimize the demand on computing resource (e.g., CPU cycles). As also disclosed above, the resource-accuracy profiler 1412 implements at least two features to accomplish this goal: 1) eliminating common sub-expressions by merging multiple query plans; and (2) caching intermediate results of video query components.

The planner 1410 is configured to determine an optimal set of video query plans 1428 for the video queries 1414 using the video query plans 1416, the placement values 1418, the accuracy values 1420, and the resource demand values 1422. In one embodiment, the planner 1410 implements the greedy heuristic shown in the foregoing pseudo-code in lines 1-13. In addition, the planner 1410 determines the Pareto band of video query configurations 1426 in its determination of the optimal video query plans 1428. Furthermore, the pseudo-code may be modified (e.g., by modifying lines 11-12) to accommodate the merging of common components of the video queries 1414.

As the execution of the planner 1410 and/or the resource-accuracy profiler 1412 may demand resources of the global manager 1304, the global manager 1304 may also implement a scheduler 1408 to manage their execution. In one embodiment, the scheduler 1408 is configured to schedule the execution of the resource-accuracy profiler 1412 using a selected video query and associated video query plan. The scheduler 1408 may be implemented using one or more scheduling disciplines including, but not limited to, first-come first-served (FIFO), earliest deadline first (EDF), shortest remaining time first (SRTF), fixed priority pre-emptive scheduling (FPPS), round-robin scheduling (RRS), multilevel queue scheduling, and other such scheduling disciplines now known or later developed. Examples of schedulers that may be used as the scheduler 1408 include, but are not limited to, the scheduler found in the Microsoft® Windows® operating system, the Linux® operating system, the Mac® OS X® operating system, and other such operating systems, modifications, or combinations thereof.

After the planner 1410 determines the optimal video query plans 1428, the global manager 1304 communicates the determined set of video query plans 1428 to respective local managers 1306,1308 that are associated with the video queries 1414. In this regard the local manager 1306 is sent instructions 1432 and the local manager 1308 is sent instructions 1436. The instructions 1432,1436 instruct the local managers 1306,1308 where to instantiate the components of the local video queries 1430,1434 (e.g., indicated by the placement values 1418) and the attribute values (e.g., quality, framerate, etc.) at which to execute the local video queries 1430,1434. In this manner, the local managers 1306,1308 facilitate the execution of the local video queries 1430,1434 while the global manager 1304 is responsible for determining an optimal configuration of these video queries. This arrangement can be particularly technically beneficial where the local managers 1306,1308 have access to a predetermined set of resources, and the efficient use of such resources requires an accounting of all the video query components that have access to such resources.

Figure 15A:
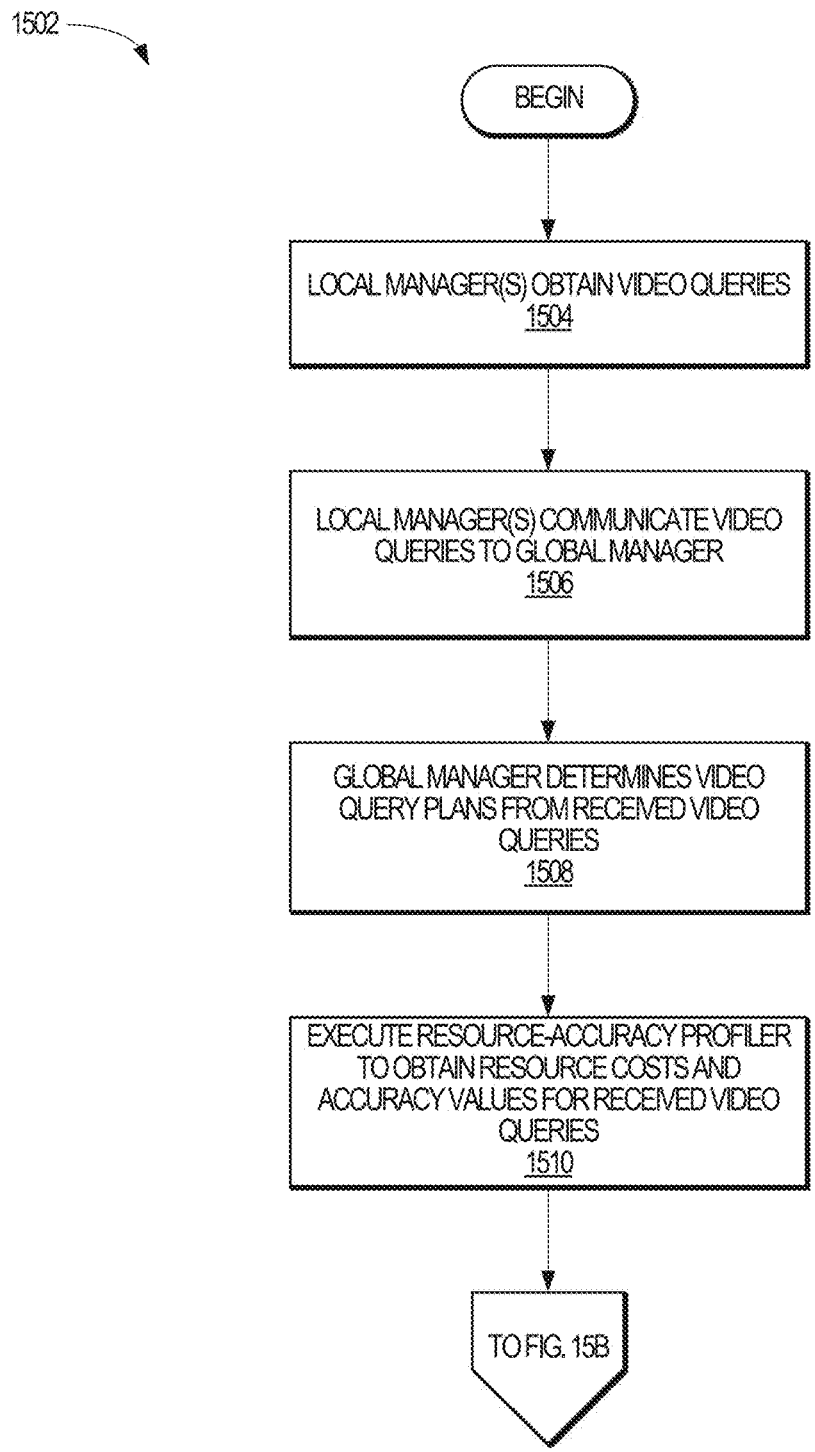
FIGS. 15A-15B illustrate a method for processing live video streams over hierarchical clusters, in accordance with an example embodiment.
Figure 15B:
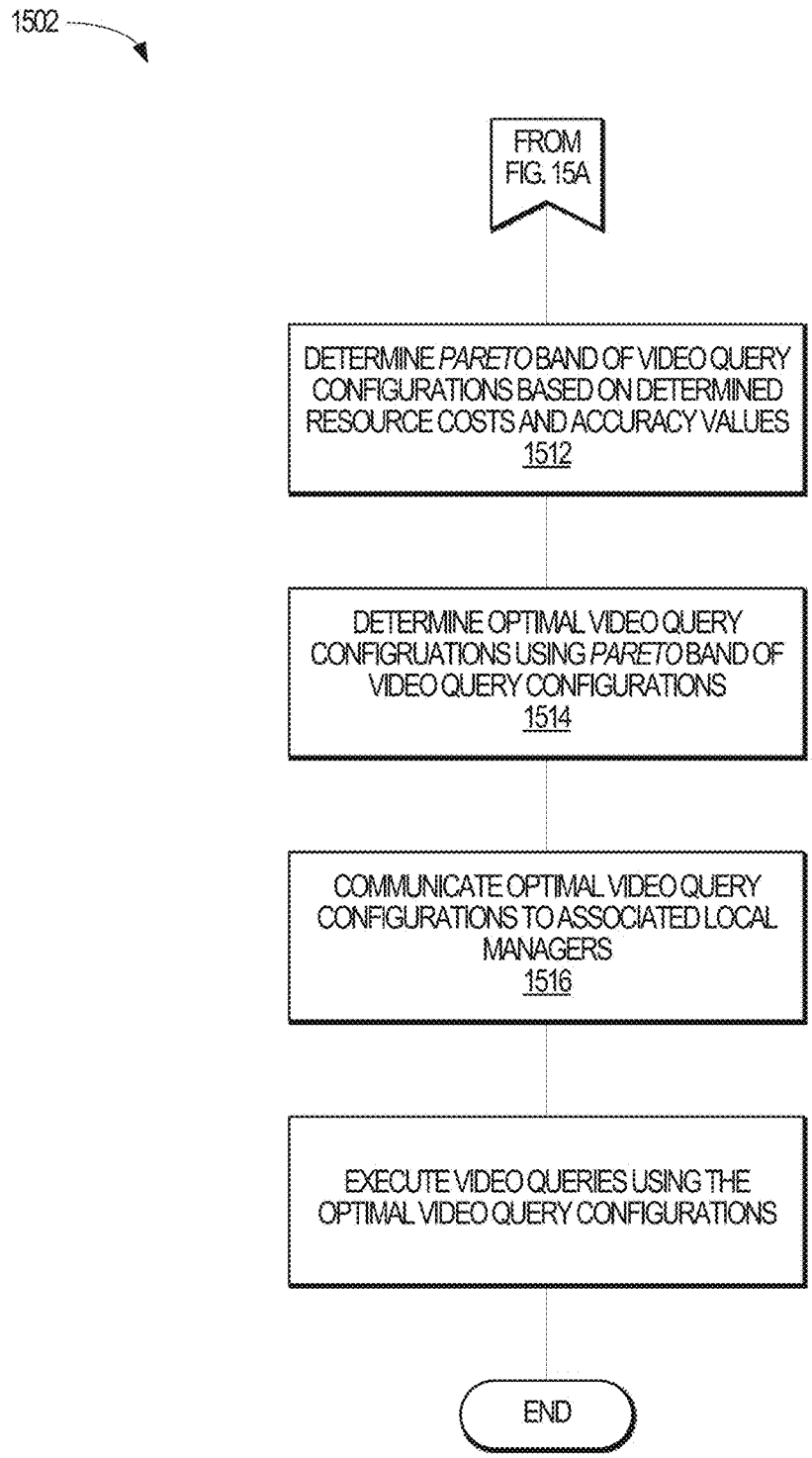

FIGS. 15A-15B illustrate a method 1502 for processing live video streams over hierarchical clusters, in accordance with an example embodiment. The method 1502 may be implemented by the global manager 1304 illustrated in FIGS. 13-14, and is discussed by way of reference thereto.

Referring initially to FIG. 15A, one or more of the local manager(s) 1306-1308 obtains video queries 1430-1434 representing the available resources and components (Operation 1504). In one embodiment, each of the local manager(s) 1306-1308 query the various resources in communication with the local manager(s) 1306-1308 to obtain a determination of the resources available for assignment. Additionally and/or alternatively, a user or other administrative may program or configure the local manager(s) 1306-1308 with the video queries 1430,1434 to instantiate within their respective clusters. Thus, in this manner, the local manager(s) 1306-1308 obtain an accounting of the resources available to the video queries 1430,1434 for processing one or more video streams.

The local manager(s) 1306-1308 then communicate the one or more video queries 1430,1434 to the global manager 1304 for determining the various placement values 1418 and the optimal video query plans 1428 to use with each video query 1430,1434 (Operation 1506). In one embodiment, the video queries communicated to the global manager 1304 become the video queries 1414.

Thereafter, the global manager 1304 then determines the video query plans associated with, and/or available to, each of the video queries 1414 (Operation 1508). In one embodiment, the global manager 1304 extracts the various attributes of each JSON query corresponding to each of the video queries 1414. The attributes of each of the JSON queries provide the requisite information for the resource-accuracy profiler 1412 to determine and/or estimate accuracies for the various combination of available video query plans. For example, and with reference to Table 1, the attributes may provide the various knob and resource values used in each of the video query plans.

The global manager 1304 then executes the resource-accuracy profiler 1412 to determine and/or estimate the accuracy values 1420 and the resource demand values 1422 for each of the query plans associated with a particular video query of the video queries 1414 (Operation 1510). As explained above, the resource-accuracy profiler 1412 may determine the accuracy values 1420 and the resource demand values 1422 by executing each video query of the video queries 1414 on a labeled dataset obtained via a crowdsourcing technique or by labeling the dataset using a predetermined and/or preprogrammed video query plan known to be resource-intensive but configured to produce highly accurate outputs. In addition, and in one embodiment, the execution of the various video queries 1414 by the resource-accuracy profiler 1412 is managed by the scheduler 1408, which ensures that the resources available to the global manager 1304 for executing the video queries 1414 are used in an efficient manner.

Referring next to FIG. 15B, the planner 1410 then determines the Pareto band of video query configurations 1426 using the determined accuracy values 1420, resource demand values 1422, and placement values 1418 for each of the video queries 1414 (Operation 1512). In one embodiment, each video query is associated with a corresponding set of video query configurations that lie along the Pareto band of video query configurations. As explained above, a Pareto band includes an initial Pareto boundary and a S-Pareto boundary. A video query configuration is said to lie on the Pareto boundary if there does not exist any other configuration with a lower cost and higher accuracy. For every point not on the Pareto boundary, there is at least one point on the boundary that is better in both accuracy (e.g., a higher accuracy value) and cost (e.g., a lower cost value). The global manager may be configured with the δ value that determines the δ-Pareto boundary; in one embodiment, the value of δ is two. The value of δ may include other values such as three, four, five, one, and other such values.

The planner 1410 then determines the optimal set of video query configurations from the Pareto band of video query configurations (Operation 1514). As discussed earlier, and in one embodiment, the planner 1410 implements the disclosed greedy heuristic to determine the optimal video query configurations. Additionally, and/or alternatively, the greedy heuristic may be modified to support the merging of one or more of the video query configurations. The resulting set of video query configurations are then used to configure their respective stored as the optimal video query plans 1428.

Thereafter, the global manager 1304 communicates the optimal video query plans 1428 to the local manager 1306, 1308 as instructions 1432,1436 (Operation 1516). In one embodiment, the instructions 1432,1436 include an assignments of values defined by the optimal video query plans 1428 as one or more attribute values for each of the video queries 1430,1434 (e.g., one or more placement values, one or more resolution values, one or more framerate values, etc.). The local managers 1306,1308 then execute the local video queries 1430,1434 with attribute values (e.g., video query configurations) as determined by the global manager 1304.

In this manner, this disclosure provides for systems and methods that determine an optimal arrangement of components used in evaluating video queries. Unlike prior implementations, the disclosed systems and methods consider both the placement values available to the components of the video queries and the knob configurations of such components. Thus, this disclosure provides a technical solution to a technical problem arising in the field of real-time video processing, computing resource management, and telecommunications.

The disclosed systems and methods were evaluated with a Microsoft® Azure® deployment emulating a hierarchy of clusters using representative video queries, and complemented using large-scale simulations. The disclosed systems and methods were found to outperform a typical fair allocation of resources by up to 15.7× better average accuracy, while being within 6% of the optimal accuracy. In addition, merging video queries with common components improved the gains to 27.2× better accuracy. Finally, searching for video query configurations within the Pareto band dropped the running time of the foregoing heuristic by 80% while still achieving ≥90% of the original accuracy.

In performing the foregoing evaluation, a 24-node Microsoft® Azure® cluster was used to emulate a hierarchical setup. Each node in the cluster was instantiated as a virtual machine instance having four CPU cores and 14 GB of memory. Ten of the nodes were assigned a "video camera computing node," with two cameras per node. The 20 video cameras "played" feeds from 20 recorded streams from many cities in the United States at their original resolution and frame rate. Two nodes were designated as private cluster. Each video camera had a 600 Kb/s network connection to the private cluster, resembling the bandwidths available today. The public cloud was designated as 12 nodes with a 5 Mb/s uplink from the private cluster.

The foregoing simulation was profiled and evaluated using the following video queries: an object tracker video query, a DNN-based object classifier, a car counter, and a license plate reader. Each of the video queries have 300, 20, 10, and 30 query plans, respectively, from different implementation and knob choices. Each query had two components and among the three clusters in the hierarchy there were six placement options per query: both components in the same private cluster or each in a different cluster. Approximately 200, 5-minute video clips from many locations and time of day were used, and hence, there were approximately 200 profiles.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-16 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 16:
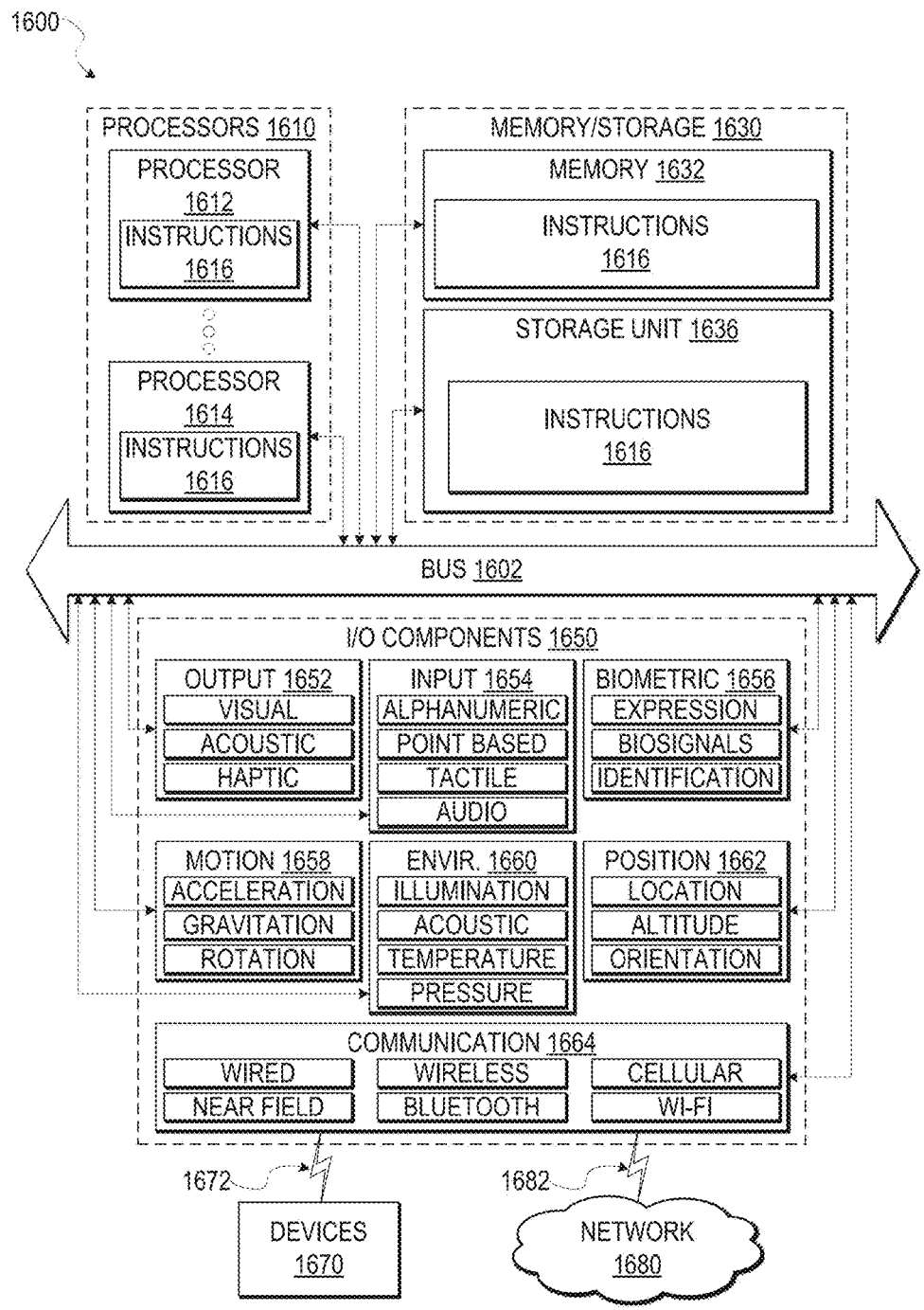
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions 1616 may cause the machine 1600 to execute the methods, algorithms, and heuristics disclosed herein and as illustrated in FIGS. 15A-15B. Additionally, or alternatively, the instructions 1616 may implement one or more of the components of disclosed herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a PDA, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1612 and processor 1614 that may execute the instructions 1616. The term "processor" is intended to include multi-core processor that may comprise two or more independent processors (sometimes referred to as "cores") that may execute instructions 1616 contemporaneously. Although FIG. 16 shows multiple processors 1610, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions 1616 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672, respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system for processing live video streams over hierarchical clusters, the system comprising:
   a machine-readable memory storing computer-executable instructions stored thereon; and
   one or more hardware processors in communication with the machine-readable memory that, having executed the computer-executable instructions, are configured to:
      receive a plurality of video queries from at least one local manager that manages a plurality of video cameras, wherein:
         at least one video query selected from the plurality of video queries comprises a plurality of video query plans for processing a live video stream and a at least one resource cost for executing a corresponding video query plan on a resource corresponding to the at least one resource cost; and
         each video camera of the plurality of video cameras is associated with a corresponding video query selected from the plurality of video queries;
      determine a plurality of accuracy values for each of the video query plans for each video query of the plurality of video queries;
      determine a first subset of video query configurations from the plurality of video query plans for each video query using the determined plurality of accuracy values and the at least one resource cost associated with each video query;
      determine an optimal video query configuration from the first subset of video query configurations for each video query; and
      communicate instructions to the at least one local manager that instruct the local manager to implement the plurality of video queries with the corresponding determined optimal video query configurations.

2. The system of claim 1, wherein:
   the at least one video query comprises a plurality of placement options indicating where a component of the at least one video query is executable; and
   the first subset of video query configurations are further determined based on the plurality of placement options associated with their respective video query.

3. The system of claim 1, wherein the first subset of video query configurations is based on a first boundary and a second boundary, the first boundary and the second boundary being defined relative to the plurality of accuracy values and a plurality of costs associated with executing each of the video query plans.

4. The system of claim 1, wherein the optimal video query configurations are determined from the first subset of video query configurations through an iterative and greedy heuristic.

5. The system of claim 1, wherein the one or more hardware processors are further configured to merge common components of selected video queries based on the determined optimal video query configurations.

6. The system of claim 1, wherein at least one accuracy value is determined after merging a plurality of video query plans for a selected video query of the plurality of video queries.

7. The system of claim 1, wherein the at least one resource cost is defined as $S_{i,j,k}=$ $$\max_l \frac{D_{i,j,k}^l}{C_l},$$

where:
- $S_{i,j,k}$ is the resource cost of a video query i when using a video query plan j and a placement option k;
- $D_{i,j,k}^l$ is a demand on the resource l of the video query i when using a video query plan j and the placement option k; and
- $C_l$ is a capacity of the resource l.

8. A method for processing live video streams over hierarchical clusters, the method comprising:
  receiving, by at least one hardware processor, a plurality of video queries from at least one local manager that manages a plurality of video cameras, wherein:
    at least one video query selected from the plurality of video queries comprises a plurality of video query plans for processing a live video stream and a at least one resource cost for executing a corresponding video query plan on a resource corresponding to the at least one resource cost; and
    each video camera of the plurality of video cameras is associated with a corresponding video query selected from the plurality of video queries;
  determining, by at least one hardware processor, a plurality of accuracy values for each of the video query plans for each video query of the plurality of video queries;
  determining, by at least one hardware processor, a first subset of video query configurations from the plurality of video query plans for each video query using the determined plurality of accuracy values and the at least one resource cost associated with each video query;
  determining, by at least one hardware processor, an optimal video query configuration from the first subset of video query configurations for each video query; and
  communicating, by at least one communication interface, instructions to the at least one local manager that instruct the local manager to implement the plurality of video queries with the corresponding determined optimal video query configurations.

9. The method of claim 8, wherein:
  the at least one video query comprises a plurality of placement options indicating where a component of the at least one video query is executable; and
  the first subset of video query configurations are further determined based on the plurality of placement options associated with their respective video query.

10. The method of claim 8, wherein the first subset of video query configurations is based on a first boundary and a secondary boundary, the first boundary and the second boundary being defined relative to the plurality of accuracy values and a plurality of costs associated with executing each of the video query plans.

11. The method of claim 8, wherein the optimal video query configurations are determined from the first subset of video query configurations through an iterative and greedy heuristic.

12. The method of claim 8, further comprising:
  merging common components of selected video queries based on the determined optimal video query configurations.

13. The method of claim 8, wherein at least one accuracy value is determined after merging a plurality of video query plans for a selected video query of the plurality of video queries.

14. The method of claim 8, wherein the at leas one resource cost is defined as $S_{i,j,k}=$ $$\max_l \frac{D_{i,j,k}^l}{C_l},$$

where:
- $S_{i,j,k}$ is the resource cost of a video query i when using a video query plan j and a placement option k;
- $D_{i,j,k}^l$ is a demand on the resource l of the video query i when using a video query plan j and the placement option k; and
- $C_l$ is a capacity of the resource l.

15. A machine-readable medium having computer-executable instructions stored thereon that, when executed by at least one hardware processor, cause a computing system to perform a plurality of operations comprising:
  receiving a plurality of video queries from at least one local manager that manages a plurality of video cameras, wherein:
    at least one video query selected from the plurality of video queries comprises a plurality of video query plans for processing a live video stream and a at least one resource cost for executing a corresponding video query plan on a resource corresponding to the at least one resource cost; and
    each video camera of the plurality of video cameras is associated with a corresponding video query selected from the plurality of video queries;
  determining a plurality of accuracy values for each of the video query plans for each video query of the plurality of video queries;
  determining a first subset of video query configurations from the plurality of video query plans for each video query using the determined plurality of accuracy values and the at least one resource cost associated with each video query;
  determining an optimal video query configuration from the first subset of video query configurations for each video query; and
  communicating instructions to the at least one local manager that instruct the local manager to implement the plurality of video queries with the corresponding determined optimal video query configurations.

16. The machine-readable medium of claim 15, wherein:
  the at least one video query comprises a plurality of placement options indicating where a component of the at least one video query is executable; and
  the first subset of video query configurations are further determined based on the plurality of placement options associated with their respective video query.

17. The machine-readable medium of claim 15, wherein the first subset of video query configurations is based on a first boundary and a second boundary, the first boundary and the second boundary being defined relative to the plurality of accuracy values and a plurality of costs associated with executing each of the video query plans.

18. The machine-readable medium of claim 15, wherein the optimal video query configurations are determined from the first subset of video query configurations through an iterative and greedy heuristic.

19. The machine-readable medium of claim 15, wherein at least one accuracy value is determined after merging a plurality of video query plans for a selected video query of the plurality of video queries.

20. The machine-readable medium of claim 15, wherein the at least one resource cost is defined as $$S_{i,j,k} = \max_l \frac{D^l_{i,j,k}}{C_l},$$

where:
- $S_{i,j,k}$ is the resource cost of a video query i when using a video query plan j and a placement option k;
- $D_{i,j,k}^l$ is a demand on the resource l of the video query i when using a video query plan j and the placement option k; and
- $C_l$ is a capacity of the resource l.

* * * * *